United States Patent
Senesac et al.

(10) Patent No.: US 9,340,304 B2
(45) Date of Patent: May 17, 2016

(54) AIRCRAFT COMPARISON SYSTEM

(71) Applicant: The Boeing Company, Chicago, IL (US)

(72) Inventors: Christopher J. Senesac, Daniel Island, SC (US); Ralph P. Heinefield, North Charleston, SC (US); Michael Honea, Summerville, SC (US)

(73) Assignee: THE BOEING COMPANY, Chicago, IL (US)

( * ) Notice: Subject to any disclaimer, the term of this patent is extended or adjusted under 35 U.S.C. 154(b) by 412 days.

(21) Appl. No.: 13/860,126

(22) Filed: Apr. 10, 2013

(65) Prior Publication Data

US 2014/0309969 A1    Oct. 16, 2014

(51) Int. Cl.
| | |
|---|---|
| G06F 17/50 | (2006.01) |
| B64F 5/00 | (2006.01) |
| G06Q 10/06 | (2012.01) |
| G06Q 10/10 | (2012.01) |
| G06Q 10/08 | (2012.01) |
| G06Q 50/04 | (2012.01) |
| G06Q 50/30 | (2012.01) |

(52) U.S. Cl.
CPC .......... *B64F 5/0009* (2013.01); *G06Q 10/0631* (2013.01); *G06Q 10/0875* (2013.01); *G06Q 10/101* (2013.01); *G06Q 10/103* (2013.01); *G06Q 50/04* (2013.01); *G06Q 50/30* (2013.01); *Y02P 90/30* (2015.11)

(58) Field of Classification Search
CPC ........ B64F 5/009; G06Q 50/04; G06Q 50/30; G06Q 10/0875; G06Q 10/103; G06Q 10/101; G06Q 10/0631

USPC ............................................................. 703/1
See application file for complete search history.

(56) References Cited

U.S. PATENT DOCUMENTS

| | | | |
|---|---|---|---|
| 3,744,917 A | * | 7/1973 | Craig ............................ 356/394 |
| 4,815,190 A | | 3/1989 | Haba et al. |
| 4,894,908 A | | 1/1990 | Haba et al. |
| 5,023,805 A | | 6/1991 | Aune |
| 5,367,552 A | | 11/1994 | Peschmann |
| 5,544,558 A | | 8/1996 | Hughes |

(Continued)

FOREIGN PATENT DOCUMENTS

| | | |
|---|---|---|
| EP | 1321869 A2 | 6/2003 |
| EP | 2431915 A2 | 3/2012 |

(Continued)

OTHER PUBLICATIONS

Gass et al., "Locator System for Three-Dimensional Visualization," U.S. Appl. No. 13/855,102, filed Apr. 2, 2013, 87 pages.

(Continued)

*Primary Examiner* — Dwin M Craig
(74) *Attorney, Agent, or Firm* — Yee & Associates, P.C.

(57) ABSTRACT

A method and apparatus for comparing aircraft parts. A first model is identified for a first aircraft for assembly. A second model is identified for a second aircraft that has been assembled. First parts for the aircraft in the first model are compared with second parts for the second aircraft in the second model. Graphical representations of the first parts and the second parts are displayed illustrating a difference between the first parts and the second parts from a comparison of the first parts and the second parts.

20 Claims, 22 Drawing Sheets

(56) References Cited

U.S. PATENT DOCUMENTS

| | | | |
|---|---|---|---|
| 5,771,043 A | 6/1998 | Nigawara et al. |
| 5,822,218 A | 10/1998 | Moosa et al. |
| 5,960,104 A | 9/1999 | Conners |
| 6,000,610 A | 12/1999 | Talbott et al. |
| 6,167,394 A | 12/2000 | Leung et al. |
| 6,240,328 B1 | 5/2001 | LaLonde et al. |
| 6,378,387 B1 | 4/2002 | Froom |
| 6,381,506 B1 | 4/2002 | Grappone |
| 6,418,189 B1 | 7/2002 | Schafer |
| 6,477,471 B1 | 11/2002 | Hedstrom et al. |
| 6,481,096 B2 | 11/2002 | Lehmker |
| 6,487,479 B1 | 11/2002 | Nelson |
| 6,597,761 B1 | 7/2003 | Garms, III |
| 6,604,681 B1 | 8/2003 | Burke |
| 6,637,266 B1 | 10/2003 | Froom |
| 6,912,507 B1 | 6/2005 | Phillips |
| 6,941,204 B2 | 9/2005 | Halm |
| 7,042,346 B2 | 5/2006 | Paulsen |
| 7,050,894 B2 | 5/2006 | Halm et al. |
| 7,103,434 B2 | 9/2006 | Chernyak |
| 7,167,583 B1 | 1/2007 | Lipson et al. |
| 7,302,443 B2 | 11/2007 | Nakajima et al. |
| 7,333,991 B2 | 2/2008 | Hill et al. |
| 7,343,213 B1 | 3/2008 | Burgess |
| 7,353,192 B1 | 4/2008 | Ellis et al. |
| 7,365,747 B2 | 4/2008 | Finlayson et al. |
| 7,366,688 B2 | 4/2008 | Kwasniewski et al. |
| 7,646,384 B2 | 1/2010 | Anderson et al. |
| 7,650,202 B2 | 1/2010 | Strohband et al. |
| 7,933,441 B2 | 4/2011 | Numata |
| 7,954,070 B2 | 5/2011 | Plocher |
| 8,027,745 B1 | 9/2011 | Freeze |
| 8,051,547 B2 | 11/2011 | Toh |
| 8,079,130 B2 | 12/2011 | Hardouin-Finez |
| 8,116,529 B2 * | 2/2012 | Edwards | 382/104 |
| 8,352,904 B2 | 1/2013 | Hodges |
| 8,482,412 B2 | 7/2013 | Majoros et al. |
| 8,527,348 B2 | 9/2013 | Petrov |
| 8,571,951 B2 | 10/2013 | Diana et al. |
| 8,606,540 B2 | 12/2013 | Haisty et al. |
| 8,610,761 B2 | 12/2013 | Haisty et al. |
| 8,620,627 B2 | 12/2013 | Nakhle et al. |
| 8,791,823 B2 | 7/2014 | Xu |
| 8,849,636 B2 | 9/2014 | Becker |
| 8,860,760 B2 | 10/2014 | Chen |
| 8,914,149 B2 | 12/2014 | Safa-Bakhsh et al. |
| 2002/0004710 A1 * | 1/2002 | Murao | G06T 17/005 |
| | | | 702/167 |
| 2002/0007225 A1 | 1/2002 | Costello et al. |
| 2002/0071524 A1 | 6/2002 | Renkart |
| 2002/0168083 A1 | 11/2002 | Garms |
| 2002/0198764 A1 | 12/2002 | Schorno |
| 2003/0055812 A1 | 3/2003 | Williams et al. |
| 2003/0083794 A1 | 5/2003 | Halm |
| 2003/0120472 A1 | 6/2003 | Lind |
| 2003/0158702 A1 | 8/2003 | Busche et al. |
| 2004/0068350 A1 | 4/2004 | Tomson |
| 2004/0093100 A1 | 5/2004 | Gleis |
| 2004/0098151 A1 | 5/2004 | Carlucci et al. |
| 2004/0162651 A1 | 8/2004 | Halm |
| 2005/0044011 A1 | 2/2005 | Deal |
| 2005/0228708 A1 * | 10/2005 | Catala et al. | 705/9 |
| 2005/0278062 A1 | 12/2005 | Janert et al. |
| 2006/0106682 A1 * | 5/2006 | Van Dyck et al. | 705/27 |
| 2006/0119601 A1 | 6/2006 | Finlayson et al. |
| 2007/0013709 A1 | 1/2007 | Charles et al. |
| 2007/0106414 A1 | 5/2007 | Strohband et al. |
| 2007/0219645 A1 | 9/2007 | Thomas et al. |
| 2007/0242083 A1 * | 10/2007 | Kataoka | G06K 9/00214 |
| | | | 345/623 |
| 2008/0140270 A1 | 6/2008 | Davis et al. |
| 2008/0187897 A1 | 8/2008 | Franzen et al. |
| 2008/0205763 A1 * | 8/2008 | Marsh et al. | 382/190 |
| 2008/0209342 A1 | 8/2008 | Taylor |
| 2008/0234850 A1 | 9/2008 | Bowling et al. |
| 2008/0252311 A1 | 10/2008 | Koh et al. |
| 2008/0294395 A1 | 11/2008 | Lu |
| 2008/0301012 A1 | 12/2008 | Cogswell et al. |
| 2009/0013281 A1 | 1/2009 | Helfman et al. |
| 2009/0138230 A1 | 5/2009 | Davies et al. |
| 2009/0144962 A1 | 6/2009 | Hardouin-Finez |
| 2009/0192644 A1 | 7/2009 | Meyer et al. |
| 2009/0228133 A1 | 9/2009 | Loda |
| 2009/0312897 A1 | 12/2009 | Jamrosz et al. |
| 2010/0010794 A1 | 1/2010 | Sweers |
| 2010/0042952 A1 | 2/2010 | Geesey |
| 2010/0097195 A1 | 4/2010 | Majoros et al. |
| 2010/0125468 A1 | 5/2010 | Avery et al. |
| 2010/0161095 A1 | 6/2010 | Lindgren |
| 2010/0175013 A1 | 7/2010 | Krauter et al. |
| 2010/0299304 A1 | 11/2010 | Vasudevan |
| 2011/0022208 A1 | 1/2011 | Bouffiou et al. |
| 2011/0041088 A1 | 2/2011 | Mason et al. |
| 2011/0046763 A1 | 2/2011 | Tsuchiya et al. |
| 2011/0087466 A1 | 4/2011 | Vossmann |
| 2011/0087513 A1 | 4/2011 | Floyd et al. |
| 2011/0137443 A1 | 6/2011 | Farahani |
| 2011/0166824 A1 | 7/2011 | Hasity et al. |
| 2011/0169924 A1 | 7/2011 | Haisty et al. |
| 2011/0172795 A1 | 7/2011 | Hansen et al. |
| 2011/0251711 A1 | 10/2011 | Goel |
| 2011/0288840 A1 | 11/2011 | Kropinski et al. |
| 2012/0007852 A1 | 1/2012 | Morate et al. |
| 2012/0030926 A1 | 2/2012 | Toh et al. |
| 2012/0050522 A1 | 3/2012 | Slyck et al. |
| 2012/0062725 A1 | 3/2012 | Wampler, II et al. |
| 2012/0071998 A1 | 3/2012 | Davies et al. |
| 2012/0075343 A1 | 3/2012 | Chen et al. |
| 2012/0100520 A1 | 4/2012 | Jo et al. |
| 2012/0130521 A1 | 5/2012 | Kohlhoff |
| 2012/0140041 A1 | 6/2012 | Burgunder et al. |
| 2012/0249588 A1 | 10/2012 | Tison et al. |
| 2012/0303336 A1 | 11/2012 | Becker et al. |
| 2012/0304059 A1 | 11/2012 | McCloskey |
| 2012/0306666 A1 * | 12/2012 | Xu | B64F 5/0045 |
| | | | 340/945 |
| 2013/0006409 A1 | 1/2013 | Evans et al. |
| 2013/0124150 A1 | 5/2013 | Kim et al. |
| 2013/0132373 A1 | 5/2013 | Huang et al. |
| 2013/0239330 A1 | 9/2013 | Newlin et al. |
| 2013/0261876 A1 | 10/2013 | Froom |
| 2014/0013263 A1 | 1/2014 | Bailiang |
| 2014/0089030 A1 | 3/2014 | Bell |
| 2015/0134274 A1 | 5/2015 | Froom |

FOREIGN PATENT DOCUMENTS

| | | |
|---|---|---|
| EP | 2458562 A1 | 5/2012 |
| EP | 2790136 A1 | 10/2014 |
| GB | 2327289 A | 1/1999 |
| JP | 2007095039 A | 4/2007 |
| WO | WO0049544 A2 | 8/2000 |
| WO | WO2008144797 A1 | 12/2008 |
| WO | WO2011056196 A1 | 5/2011 |
| WO | WO2012166545 A2 | 12/2012 |
| WO | WO2013078156 A1 | 5/2013 |
| WO | WO2013078265 A1 | 5/2013 |

OTHER PUBLICATIONS

Senesac et al., "Condition of Assembly Visualization System Based On Build Cycles," U.S. Appl. No. 13/835,262, filed Mar. 15, 2013, 79 pages.

Senesac et al., "Shop Order Status Visualization System," U.S. Appl. No. 13/785,616, filed Mar. 5, 2013, 98 pages.

Senesac, "Condition of Assembly Visualization System," U.S. Appl. No. 13/834,893, filed Mar. 15, 2013, 73 pages.

Senesac, "Nonconformance Visualization System," U.S. Appl. No. 13/798,964, filed Mar. 13, 2013, 84 pages.

Senesac, "Object Visualization System," U.S. Appl. No. 13/780,109, filed Feb. 28, 2013, 61 pages.

Senesac, "Shop Order Status Visualization System," U.S. Appl. No. 13/858,364, filed Apr. 8, 2013, 108 pages.

(56) References Cited

OTHER PUBLICATIONS

Senesac et al., "Nonconformance Visualization System," U.S. Appl. No. 13/861,678, filed Apr. 12, 2013, 116 pages.
Senesac, "Shop Order Status Visualization System," U.S. Appl. No. 13/890,347, filed May 9, 2013, 96 pages.
Prazak et al., "Visualization of an Object Using a Visual Query System," U.S. Appl. No. 13/852,063, filed Mar. 28, 2013, 50 pages.
Senesac et al., "Aircraft Comparison System with Synchronized Displays," U.S. Appl. No. 13/922,411, filed Jun. 20, 2013, 120 pages.
Non-Patent Literature inculding images from the website www.aso. com, as published on Jan. 16, 2013 based on captures in the Internet Archive tool referred to as the WayBackMachine, http://web.archive.org/web/20130116040904/http://www.aso.com/ ("NPL"), as cited by the Examiner in Final Office Action dated Mar. 27, 2015, 3 pages.
"Marianna Airmotive Uses a FARO Laser Tracker to Reduce Repair Turnaround Time dramatically," Mar. 7, 2015, 2 pages. http://www.mariannaairmotive.com.
"What's New in SolidWorks," SolidWorks, Version 2010, 199 pages. http://files.solidworks.com/Supportfiles/Whats_new/2010/English/whatsnew.pdf.
Final Office Action, dated Mar. 27, 2015, regarding U.S. Appl. No. 13/780,109, 18 pages.
Office Action, dated Feb. 26, 2015, regarding U.S. Appl. No. 13/858,364, 32 pages.
Notice of Allowance, dated Apr. 13, 2015, regarding U.S. Appl. No. 13/858,364, 5 pages.
Office Action, dated Feb. 27, 2015, regarding U.S. Appl. No. 13/834,893, 41 pages.
Office Action, dated Mar. 4, 2015, regarding U.S. Appl. No. 13/855,102, 28 pages.
Office Action, dated Apr. 12, 2015, regarding U.S. Appl. No. 13/798,964, 39 pages.
Office Action, dated May 5, 2015, regarding U.S. Appl. No. 13/861,678, 48 pages.
Office Action, dated May 6, 2015, regarding U.S. Appl. No. 13/852,063, 39 pages.
Australian Government Patent Examination Report No. 1, dated Mar. 18, 2015, regarding Application No. 2014200514, 4 pages.
Candadian Intellectual Property Office Examination Search Report, dated Mar. 24, 2015, regarding Application No. 2,840,798, 6 pages.
Australian Government Patent Examination Report No. 1, dated Mar. 27, 2015, regarding Application No. 2014200292, 3 pages.
Canadian Intellectual Property Office Examination Search Report, dated Apr. 15, 2015, regarding Application No. 2,839,913, 4 pages.
Senesac, "Serial Number Control Visualization System," U.S. Appl. No. 14/467,706, filed Aug. 25, 2014, 113.
Extended European Search Report, dated Jul. 17, 2014, regarding Application No. 14162481.7, 5 pages.
Extended European Search Report, dated Jul. 23, 2014, regarding Application No. 14157597.7, 7 pages.
Extended European Search Report, dated Aug. 22, 2014, regarding Application No. EP14159832.6, 9 pages.
International Search Report and Written Opinion, dated Apr. 25, 2014, regarding Application No. PCT/US2014/010912, 10 pages.
Extended European Search Report, dated Jun. 2, 2014, regarding Application No. 14160787.9, 6 pages.
"Notice from the European Patent Office dated Oct. 1, 2007 concerning business methods," Official Journal EPO, Nov. 2007, pp. 592-593.
Extended European Search Report, dated Sep. 30, 2014, regarding Application No. EP14159760.9, 6 pages.
International Search Report and Written Opinion, dated Nov. 19, 2014, regarding Application No. PCT/US2014/011196, 10 pages.
International Search Report and Written Opinion, dated Dec. 1, 2014, regarding Application No. PCT/US2014/031030, 9 pages.
Extended European Search Report, dated Dec. 3, 2014, regarding Application No. 14170988.1, 7 pages.
Office Action, dated Dec. 17, 2014, regarding U.S. Appl. No. 13/780,109, 37 pages.
Office Action, dated Sep. 17, 2015, regarding U.S. Appl. No. 13/780,109, 47 pages.
Office Action, dated Jul. 24 2015, regarding U.S. Appl. No. 13/785,616, 55 pages.
Office Action, dated Sep. 21, 2015, regarding U.S. Appl. No. 13/835,262, 41 pages.
Final Office Action, dated Sep. 4, 2015, regarding U.S. Appl. No. 13/861,678, 27 pages.
Office Action, dated Aug. 14, 2015, regarding U.S. Appl. No. 13/890,347, 44 pages.
Final Office Action, dated Oct. 22, 2015, regarding U.S. Appl. No. 13/852,063, 30 pages.
Final Office Action, dated Jul. 31 2015, regarding U.S. Appl. No. 13/922,411, 23 pages.
Australian Government Patent Examination Report No. 2, dated Oct. 29, 2015, regarding Application No. 2014200304, 4 pages.
Canadian Intellectual Property Office Examination Search Report, dated Oct. 28, 2015, regarding Application No. 2,839,914, 5 pages.
Australian Government Patent Examination Report No. 1, dated May 13, 2015, regarding Application No. 2014200304, 4 pages.
Canadian Intellectual Property Office Examination Search Report, dated Feb. 17, 2015, regarding Application No. 2,839,914, 6 pages.
European Patent Office Communcation, dated Sep. 15, 2015, regarding Application No. 14157597.7, 7 pages.
Notices of Reasons for Rejection and English Translation, issued Sep. 8, 2015, regarding Japanese Patent Application No. 2014-060864, 5 pages.
Kokogawa et al., "Wide-Area Contents Distribution based on Cooperation among Digital Libraries," Information Processing Academic Society Research Report, Mar. 10, 2000, vol. 2000, No. 26, pp. 83-88.
Australian Government Patent Examination Report No. 2, dated Jul. 8, 2015, regarding Application No. 2014200514, 3 pages.
Australian Government Patent Examination Report No. 3, dated Aug. 13, 2015, regarding Application No. 2014200514, 4 pages.
Australian Government Patent Examination Report No. 2, dated Jul. 30, 2015, regarding Application No. 2014200292, 5 pages.
International Preliminary Report on Patentability, dated Sep. 1, 2015, regarding Application No. PCT/US2014/010912, 6 pages.
Notice of Allowance, dated Jun. 22, 2015, regarding U.S. Appl. No. 13/834,893, 24 pages.
Final Office Action, dated Jun. 26, 2015, regarding U.S. Appl. No. 13/855,102, 18 pages.
Office Action, dated Jun. 29, 2015, regarding U.S. Appl. No. 13/922,411, 43 pages.
Notice of Allowance, dated Nov. 6, 2015, regarding U.S. Appl. No. 13/855,102, 20 pages.
Final Office Action, dated Nov. 20, 2015, regarding U.S. Appl. No. 13/890,347, 38 pages.
Extended European Search Report, dated Nov. 18, 2015, regarding Application No. EP14159752.6, 6 pages.
Final Office Action, dated Dec. 2, 2015, regarding U.S. Appl. No. 13/785,616, 38 pages.
Roh et al., "An object-based 3D walk-through model for interior construction progress monitoring", May 3, 2010, Elsevier, Automation in construction 20, pp. 66-75.
Prazak et al., "Visualization of an Object Using a Visual Query System," U.S. Appl. No. 15/003,802, filed Jan. 22, 2016, 49 pages.
Office Action, dated Jan. 15, 2016, regarding U.S. Appl. No. 13/798,964, 36 pages.
Office Action, dated Jan. 15, 2015, regarding U.S. Appl. No. 13/861,678, 37 pages.
Slack et al., "Non-Conformance Mapping and Visualization," U.S. Appl. No. 15/056,536, filed Feb. 29, 2016, 43 pages.
Final Office Action, dated Feb. 9, 2016, U.S. Appl. No. 13/835,262, 32 pages.
Office Action, dated Mar. 28, 2016, regarding U.S. Appl. No. 13/835,262, 21 pages.
Final Office Action, dated Jan. 25, 2016, regarding U.S. Appl. No. 13/780,109, 54 pages.

\* cited by examiner

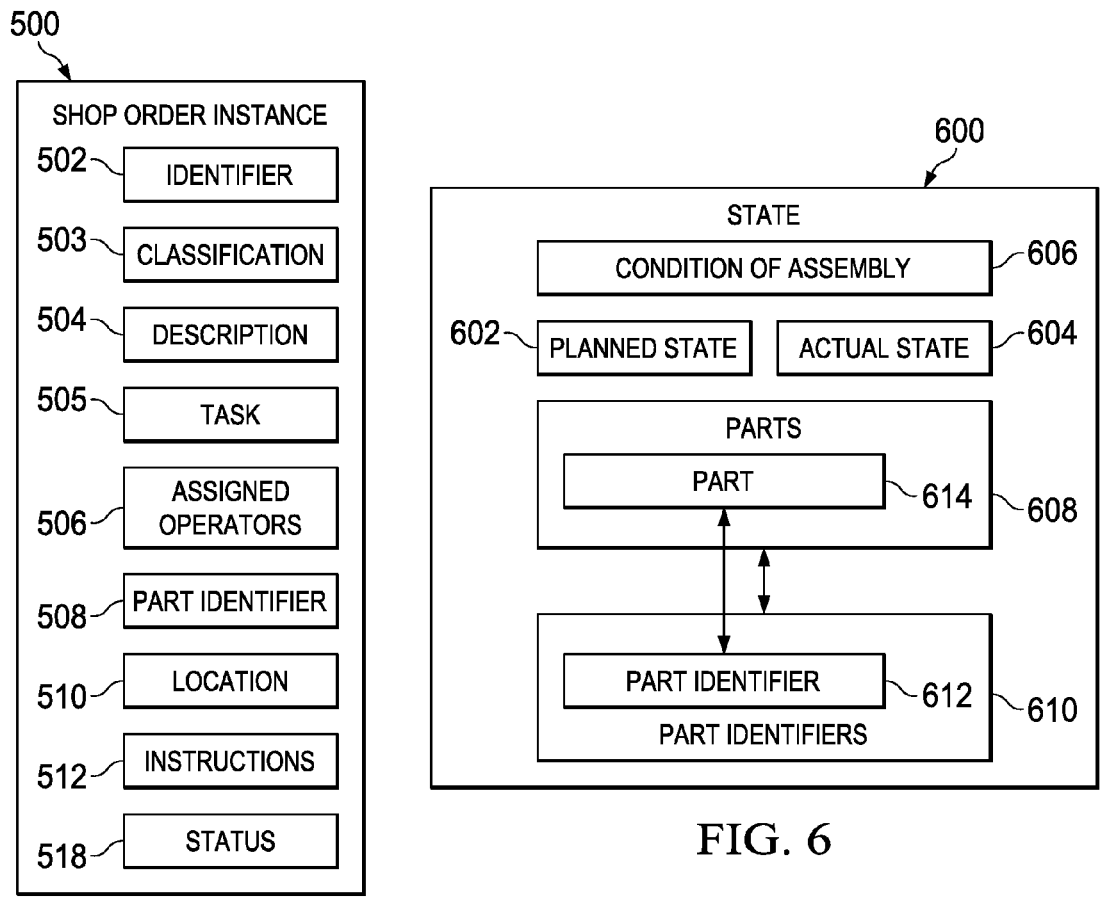
FIG. 5
FIG. 6
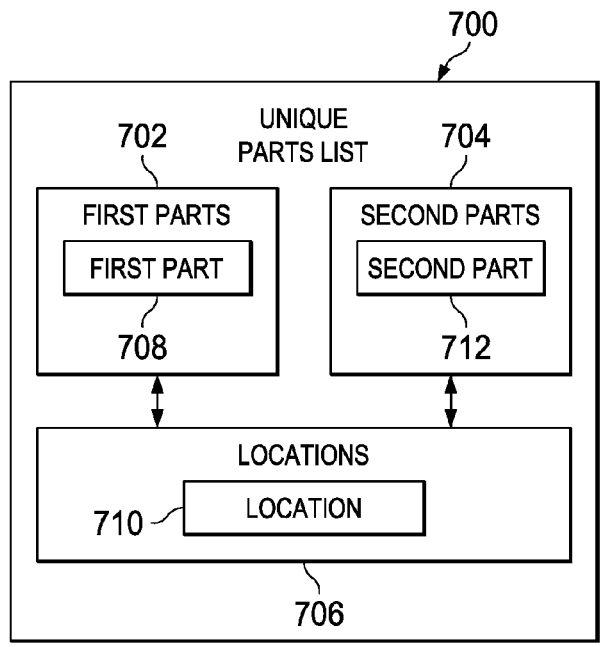
FIG. 7

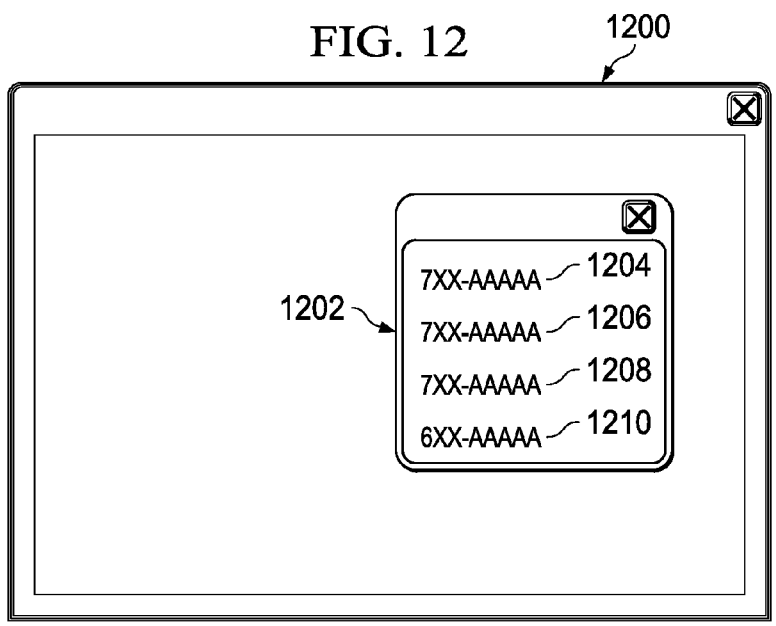

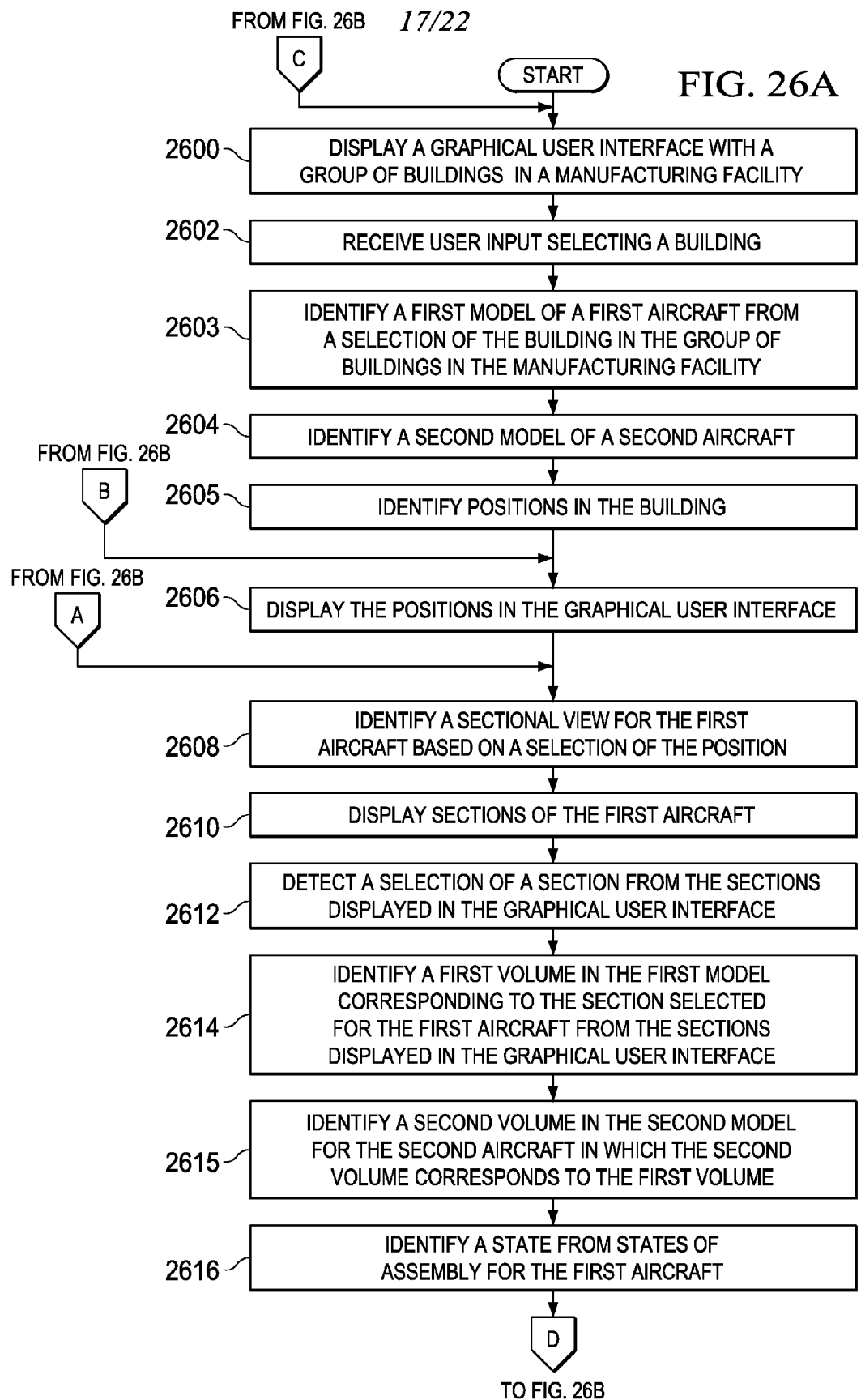

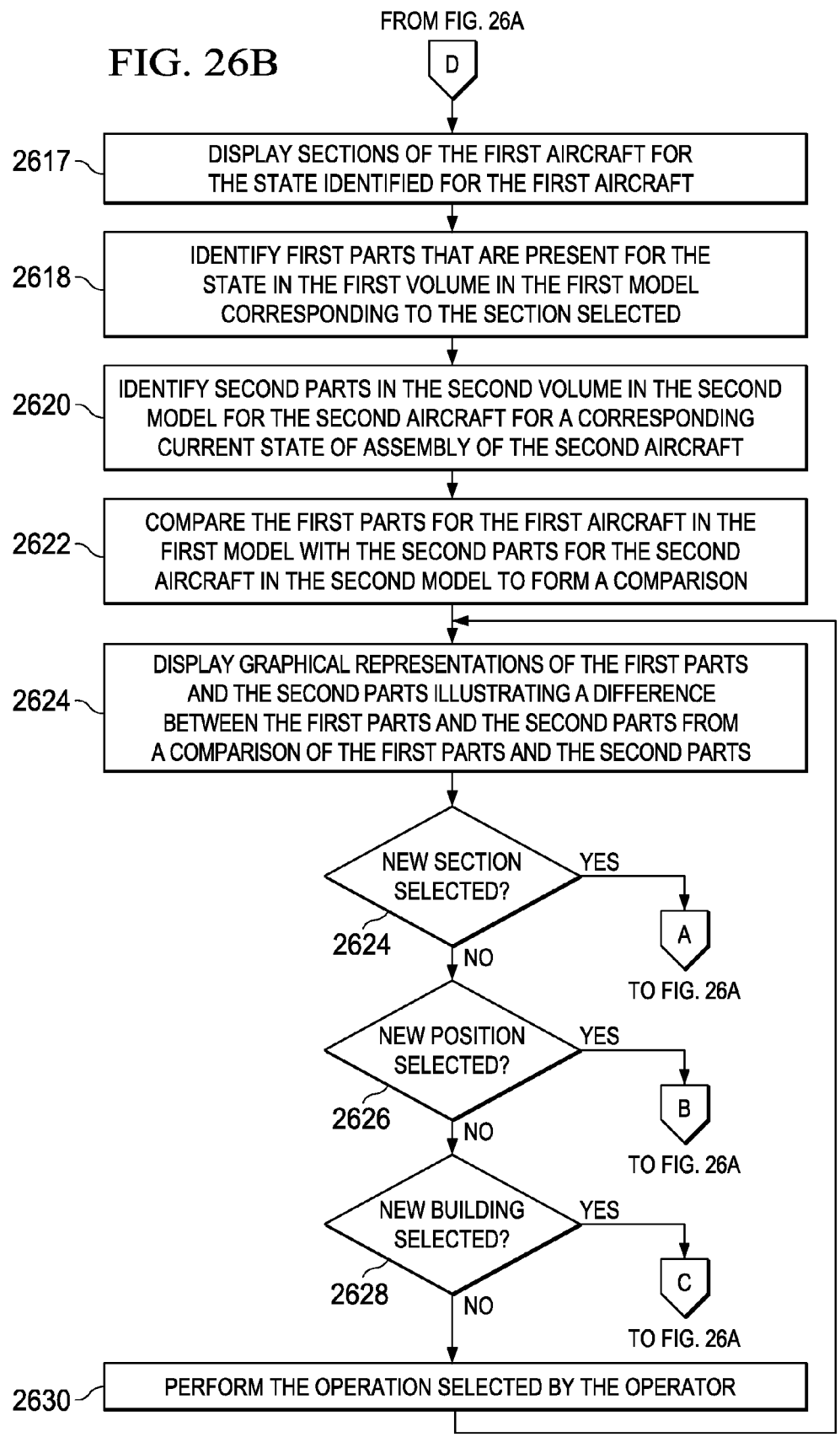

AIRCRAFT COMPARISON SYSTEM

CROSS-REFERENCE TO RELATED APPLICATIONS

This application is related to the following patent applications: entitled "Object Visualization System," Ser. No. 13/780,109, filed Feb. 28, 2013, "Shop Order Status Visualization System," Ser. No. 13/785,616, filed Mar. 5, 2013, "Nonconformance Visualization System," Ser. No. 13/798,964, filed Mar. 13, 2013, "Condition of Assembly Visualization System," Ser. No. 13/834,893, filed Mar. 15, 2013, "Condition of Assembly Visualization System Based on Build Cycles," Ser. No. 13/835,262, filed Mar. 15, 2013, "Locator System for Three-Dimensional Visualization," Ser. No. 13/855,102, filed Apr. 2, 2013, "Shop Order Status Visualization System," Ser. No. 13/858,364, filed Apr. 8, 2013, "Nonconformance Visualization System," Ser. No. 13/861,678, filed Apr. 12, 2013, "Shop Order Status Visualization System," Ser. No. 13/890,347, filed May 9, 2013, and "Aircraft Comparison System with Synchronized Displays," Ser. No. 13/922,411, filed Jun. 20, 2013, each assigned to the same assignee, and each incorporated herein by reference.

BACKGROUND INFORMATION

1. Field

The present disclosure relates generally to manufacturing and, in particular, to manufacturing vehicles. Still more particularly, the present disclosure relates to a method and apparatus for assembling vehicles in a manufacturing environment.

2. Background

The assembly of an aircraft is an extremely complex process. Hundreds of thousands of parts may be assembled for an aircraft.

The assembly of an aircraft may involve manufacturing different parts of the aircraft in geographically diverse locations. These different parts may then be finally assembled in a single location. For example, different portions of a fuselage of the aircraft may be assembled in different locations and flown to a central location where the final assembly line is located. Additionally, other parts such as engines, auxiliary power units, seats, computer systems, line replaceable units, or other components in aircraft may be shipped to this final location for assembly to form the assembled aircraft.

The assembly of the different parts involves assigning tasks to different operators. The assignment of these tasks may take the form of shop order instances. Each shop order instance may include instructions and an identification of parts for a particular assembly in the aircraft.

Currently, operators on the shop floor where the assembly of the aircraft occurs may perform various tasks to assemble the aircraft. Operators typically assemble many aircraft of the same model. Oftentimes, several aircraft may have the same options. For example, an aircraft of a particular model may have substantially the same parts with a few exceptions. These exceptions may be customer options.

For example, the customer may select the type of engine used in the aircraft from several available options. As another example, a customer may select the number of lavatories, galleys, and seats that may be present in an aircraft. Additionally, the customer also may select the locations of lavatories, galleys, seats, and other monuments in the cabin of the aircraft. Materials, colors, and other features for these options also may be selected by the customer.

When assembling an aircraft, the operators may assemble several aircraft in a row having the same options. As a result, operators of the shop floor may develop a cadence from performing work instructions for tasks to assemble the aircraft. This cadence, however, may be interrupted by a change in options.

For example, operators on the shop floor may assemble four aircraft in a row having all of the same options. A fifth aircraft may then be assembled from another customer. This fifth aircraft may have options that the operators have not assembled before.

This change in options may result in the operators spending more time reviewing instructions for tasks, blueprints, computer-aided design models, and other information. This review time is used to become familiar with the change in options, especially when new options not previously seen are present. Further, when new options are present, additional training may be needed to assemble parts for the new options.

As a result, more time may be needed to become familiar with new options for an aircraft. This time used may increase the assembly time more than desired. This additional time or training may increase the time or expense needed to assemble an aircraft.

Therefore, it would be desirable to have a method and apparatus that takes into account at least some of the issues discussed above, as well as other possible issues.

SUMMARY

In one illustrative embodiment, a method for comparing aircraft parts is present. A first model is identified for a first aircraft for assembly. A second model is identified for a second aircraft that has been assembled. First parts for the aircraft in the first model are compared with second parts for the second aircraft in the second model. Graphical representations of the first parts and the second parts are displayed illustrating a difference between the first parts and the second parts from a comparison of the first parts and the second parts.

In another illustrative embodiment, an apparatus comprises an object manager configured to identify a first model for a first aircraft for assembly. The object manager is further configured to identify a second model for a second aircraft that has been assembled. The object manager is still further configured to compare first parts for the first aircraft in the first model with second parts for the second aircraft in the second model. The object manager is further configured to display graphical representations of the first parts and the second parts illustrating a difference between the first parts and the second parts from a comparison of the first parts and the second parts.

In yet another illustrative embodiment, an aircraft manufacturing system comprises a control system and an object manager in the control system. The control system is configured to control operation of manufacturing equipment. The object manager is configured to identify a first model for a first aircraft for assembly. The object manager is further configured to identify a second model for a second aircraft that has been assembled. The object manager is still further configured to compare first parts for the first aircraft in the first model with second parts for the second aircraft in the second model. The object manager is further configured to display graphical representations of the first parts and the second parts illustrating a difference between the first parts and the second parts from a comparison of the first parts and the second parts.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 5 is an illustration of a block diagram of a shop order instance in accordance with an illustrative embodiment;

FIG. 6 is an illustration of a block diagram of a state for a section of an aircraft in accordance with an illustrative embodiment;

FIG. 7 is an illustration of a block diagram of unique parts list in accordance with an illustrative embodiment;

FIG. 12 is an illustration of a graphical user interface for selecting a type of aircraft in accordance with an illustrative embodiment;

FIG. 13 is an illustration of a graphical user interface for selecting a model of an aircraft in accordance with an illustrative embodiment;

FIGS. 26A and 26B are an illustration of a more detailed flowchart of a process for identifying differences between parts in multiple aircraft in accordance with an illustrative embodiment;

DETAILED DESCRIPTION

The illustrative embodiments recognize and take into account one or more different considerations. For example, the illustrative embodiments recognize and take into account that in performing tasks to assemble an aircraft, having knowledge of changes between a current aircraft being assembled and a prior aircraft previously assembled may aid operators on the shop floor to become more familiar with assembling the current aircraft.

The illustrative embodiments recognize and take into account that one manner in which this knowledge may be provided is through a change list. The change list may list differences between a prior aircraft build and a current aircraft build. Further, the illustrative embodiments also recognize and take into account that providing a visualization of changes between two aircraft builds may be especially useful to operators on the shop floor that assemble aircraft.

Thus, the illustrative embodiments provide a method and apparatus for comparing aircraft parts. In particular, comparison may be made for different aircraft builds. A first model for a first aircraft for assembly is identified. A second model for a second aircraft that has been assembled is identified. First parts for the first aircraft in the first model are compared with second parts for the second aircraft in the second model. Graphical representations of the first parts and the second parts are displayed illustrating a difference between the first parts and the second parts from a comparison of the first parts and the second parts.

Figure 1:
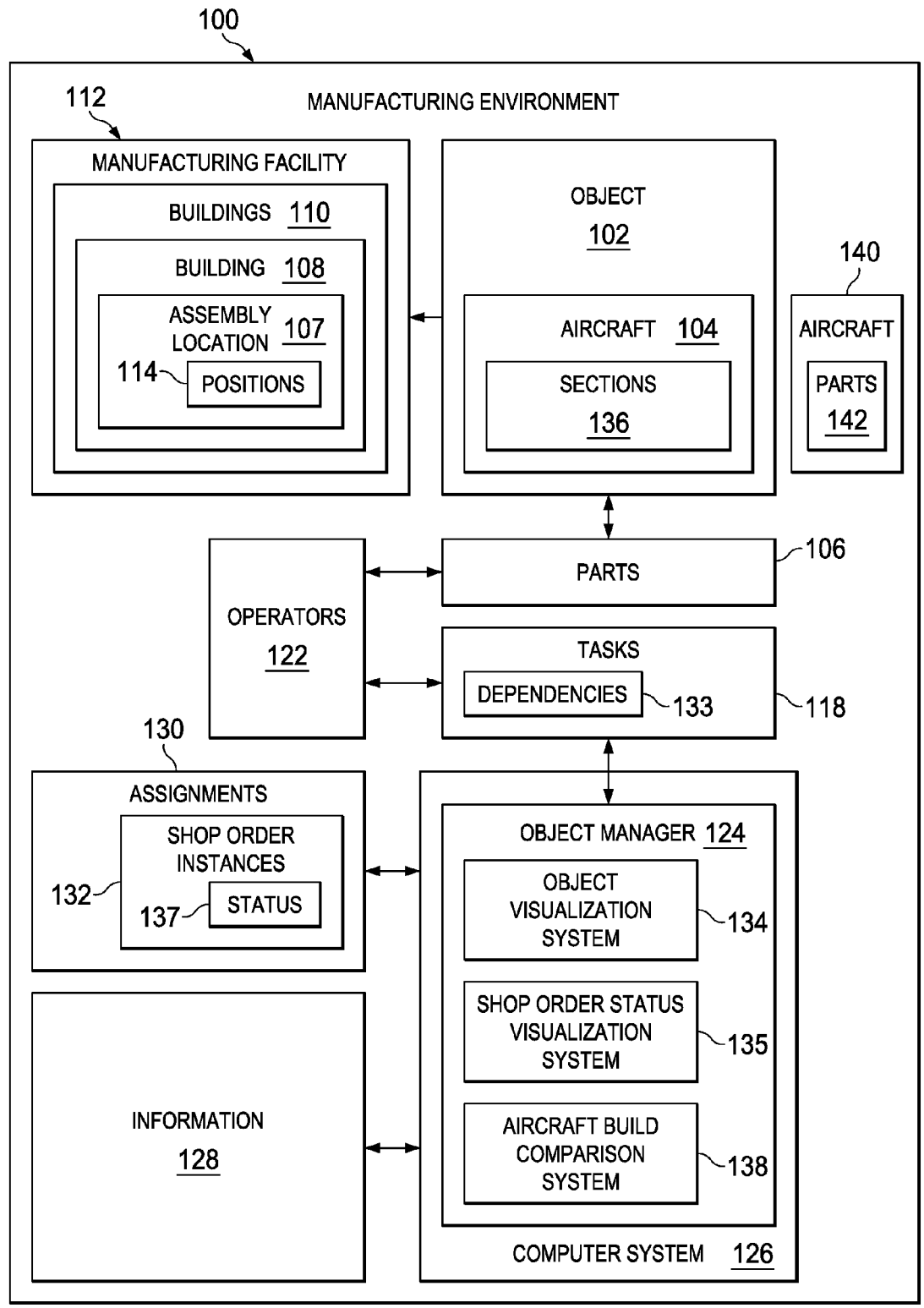
FIG. 1 is an illustration of a block diagram of a manufacturing environment in accordance with an illustrative embodiment.

With reference now to the figures, and in particular, with reference to FIG. 1, an illustration of a block diagram of a manufacturing environment is depicted in accordance with an illustrative embodiment. Manufacturing environment 100 is an example of an environment in which object 102 may be assembled.

In this illustrative example, object 102 takes the form of aircraft 104. Object 102 is completed by assembling parts 106. A part is a group of components. As used herein, a "group of," when used with reference items, means one or more items. For example, a group of components is one or more components.

A part may be a single component or assembly of components in these depicted examples. For example, the part may be a seat, a row of seats, an in-flight entertainment system, a duct, a system of ducts, a global positioning system receiver, an engine, an engine housing, an inlet, or other suitable types of parts.

In this illustrative example, assembling parts 106 may take place in assembly location 107 in building 108 of buildings 110 at manufacturing facility 112. The assembly of parts 106 in building 108 may occur in positions 114 in assembly location 107 for object 102. Each position in positions 114 is a location in building 108 in which a group of tasks 118 is performed to assemble object 102.

In these illustrative examples, a task is a piece of work. A task may be comprised of one or more operations that are performed by a group of operators 122 assigned to work on the assembly of object 102.

In the illustrative examples, object manager 124 may be used to manage the assembly of object 102. When object 102 is aircraft 104, object manager 124 may be part of an aircraft management system. Object manager 124 may be implemented in software, hardware, firmware or a combination thereof. When software is used, the operations performed by object manager 124 may be implemented in program code configured to run on a processor unit. When firmware is used, the operations performed by object manager 124 may be implemented in program code and data and stored in persistent memory to run on a processor unit. When hardware is employed, the hardware may include circuits that operate to perform the operations in object manager 124.

In the illustrative examples, the hardware may take the form of a circuit system, an integrated circuit, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, or other suitable hardware devices. Additionally, the processes may be implemented in organic components integrated with inorganic components and/or may be comprised entirely of organic components excluding a human being. For example, the processes may be implemented as circuits in organic semiconductors.

As depicted, object manager 124 may be implemented in computer system 126. Computer system 126 is one or more computers. When more than one computer is present, the computers in computer system 126 may communicate with each other using a communications medium such as a network. Computer system 126 may be located all in the same location or in different geographic locations. For example, computer system 126 may be distributed through buildings 110 or located in building 108. Portions of computer system 126 may even be located in another geographic location separate from manufacturing facility 112.

In managing the assembly of object 102, object manager 124 may manage tasks 118 and information 128 about object 102. In the illustrative example, the management of tasks 118 may include at least one of assigning tasks 118 to operators 122, monitoring the status of tasks 118, organizing tasks 118, providing information about tasks 118, or other suitable operations. Information 128 may include, for example, the models of objects, part inventories, or other suitable information relating to object 102.

As used herein, the phrase "at least one of," when used with a list of items, means different combinations of one or more of the listed items may be used and only one of each item in the list may be needed. For example, "at least one of item A, item B, and item C" may include, without limitation, item A or item A and item B. This example also may include item A, item B, and item C or item B and item C. The item may be a particular object, thing, or a category. In other words, at least one of means any combination of items and number of items may be used from the list but not all of the items in the list are required.

In these illustrative examples, object manager 124 may manage tasks 118 using assignments 130 in the form of shop order instances 132. For example, object manager 124 may assign tasks through the use of shop order instances 132 to operators 122 for performance and assembly of object 102. Additionally, the status of shop order instances 132 may be used to identify the state of assembly of object 102 by operators 122.

Additionally, tasks 118 may have dependencies 133. In other words, tasks 118 may be performed in a particular order. Dependencies 133 may dictate when tasks within tasks 118 should be performed relative to other tasks in tasks 118. Dependencies 133 may also be for parts 106 in addition to or in place of tasks 118. In this form, dependencies 133 may result in dependencies 133 for tasks 118.

As a result, dependencies 133 may affect the manner in which assignments 130 are made as shop order instances 132. In particular, dependencies 133 may be used to determine when shop order instances 132 should be performed.

In these illustrative examples, object manager 124 may provide different functions and capabilities for assembling object 102. For example, object manager 124 may include at least one of object visualization system 134, shop order status visualization system 135, or other types of systems. The systems may be implemented using hardware, software, or some combination thereof.

In one illustrative example, object visualization system 134 may provide a visualization of object 102 to operators 122. In particular, operators 122 may perform queries using object visualization system 134 to view a number of sections 136 in object 102. In particular, sections 136 may be sections that correspond to sections at manufacturing facility 112 for assembly of object 102, such as aircraft 104.

Additionally, object visualization system 134 may provide a visualization of parts 106 in aircraft 104 during different times or positions in positions 114. In other words, different amounts of parts 106 may be present at different times or positions in positions 114. Object visualization system 134 provides operators 122 an ability to visualize these different conditions of assembly for aircraft 104 as well as other types of objects. In other words, object visualization system 134 may operate as a condition of an assembly visualization system based on build cycles.

In these illustrative examples, the manufacturing may include at least one of fabricating components for parts, assembling components to form parts, assembling parts for object 102, or some other suitable manufacturing operation performed to assemble object 102. For example, object manager 124 may provide visual information about all of object 102 or one or more specific sections of object 102. This type of visualization may be especially useful when object 102 takes the form of aircraft 104. Information 128 may be used when operators 122 perform tasks 118 with respect to parts 106 to assemble aircraft 104.

In another illustrative example, shop order status visualization system 135 may provide a visualization of status 137 of shop order instances 132. This information may be provided visually to operators 122. In particular, object manager 124 may function as shop order status visualization system 135 as well as provide other suitable functions in managing the assembly of object 102.

As depicted, object manager 124 may also include aircraft build comparison system 138. Aircraft build comparison system 138 may compare the build for a first aircraft, such as aircraft 104, with a second aircraft, such as aircraft 140. This comparison may identify differences between parts 106 for aircraft 104 and parts 142 for aircraft 140. As depicted, aircraft 140 is a prior build that may be of the same model as aircraft 104 but with different options. In other words, some differences between parts 106 and parts 142 may be present. This difference may be at least one of the parts themselves, the configuration, or the location of these parts.

Further, aircraft build comparison system 138 may be configured to provide a visualization of the differences between parts 106 for aircraft 104 and parts 142 for aircraft 140. This visualization may be provided to operators 122 in a manner that provides information that may be used in assembling aircraft 104. For example, if operators 122 are used to assemble a lavatory in a location in aircraft 140, operators 122 may see through the visualization that a storage closet is present in aircraft 104 in the same or corresponding location in which the lavatory was located in aircraft 140.

Figure 2:
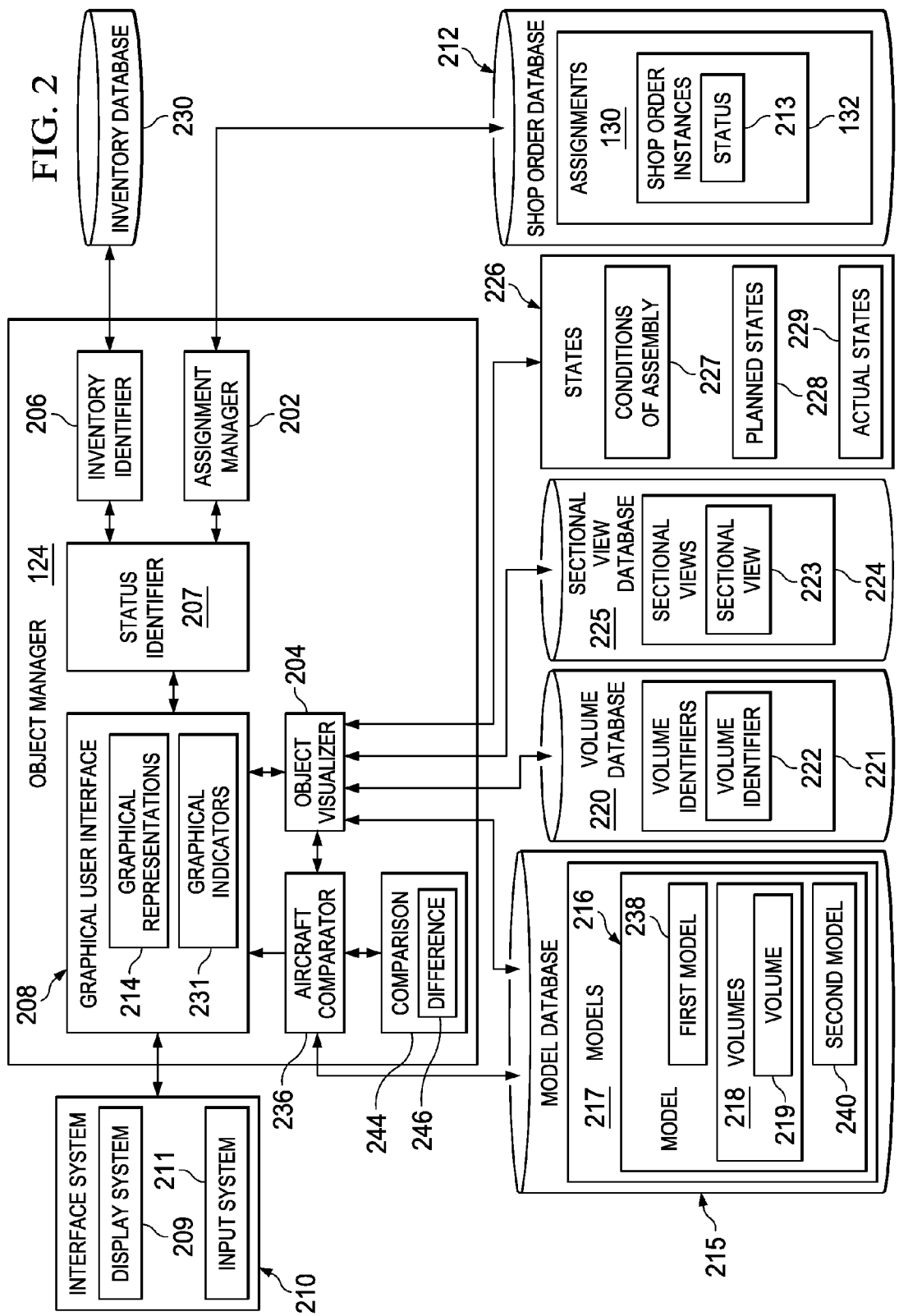
FIG. 2 is an illustration of a block diagram of an object manager in accordance with an illustrative embodiment.

Turning now to FIG. 2, an illustration of a block diagram of an object manager is depicted in accordance with an illustrative embodiment. Examples of components that may be implemented in object manager 124 in FIG. 1 are shown in this figure.

As depicted, object manager 124 includes a number of different components. For example, object manager 124 includes assignment manager 202, object visualizer 204, inventory identifier 206, status identifier 207, and graphical user interface 208. These different components along with object manager 124 may be implemented using hardware, software, or some combination thereof.

Graphical user interface 208 is configured to provide an interface for operators 122 in FIG. 1 to interact with object manager 124. In these illustrative examples, graphical user interface 208 may be displayed on display system 209 in interface system 210. Display system 209 is hardware and may include one or more display devices selected from at least one of a liquid crystal display (LCD), a light emitting display (LED), an organic light emitting display (OLED), or other suitable types of display devices.

Input may be received from operators 122 through input system 211 in interface system 210. Input system 211 is a hardware system. Input system 211 may include one or more devices. These devices may include at least one of a keyboard, a mouse, a joystick, a touchscreen panel, or other suitable types of devices.

In this illustrative example, assignment manager 202 is configured to manage assignments 130 in the form of shop order instances 132 in shop order database 212. For example, assignment manager 202 may be used to assign tasks 118 in FIG. 1 to operators 122 using shop order instances 132. Additionally, assignment manager 202 also may be configured to receive information about the performance of tasks 118 assigned through shop order instances 132. This information may be used by assignment manager 202 to generate and update status 213 for shop order instances 132.

Object visualizer 204 is configured to generate graphical representations 214 for parts 106 in FIG. 1. Graphical representations 214 may be displayed on graphical user interface 208 in display system 209. As depicted, object visualizer 204 is configured to access model database 215. Object visualizer 204 may identify model 216 from models 217 in model database 215 for object 102 in FIG. 1 and, in particular, for aircraft 104 in FIG. 1. Model 216 is used to generate graphical representations 214 in the illustrative example.

In these illustrative examples, graphical representations 214 may be generated for sections 136 of object 102 in FIG. 1, which may take the form of aircraft 104. In this illustrative example, model 216 may be identified for object 102 from models 217 in model database 215. Models 217 may take various forms. For example, without limitation, models 217 may include computer-aided design (CAD) files.

Each model in models 217 may be for a particular object. The objects may be of the same type but for different shop order instances. For example, if models 217 are for a particular type of aircraft, each model may be for a particular aircraft that is being assembled for a customer. The different models may be for the same aircraft model but may have variations for different options selected by a customer. In other illustrative examples, models 217 may include models for different types of aircraft 104.

The generation of graphical representations 214 may be based on all of model 216 or a group of volumes 218 in model 216. These items may have different shapes. For example, volume 219 in volumes 218 may be a cube, a cuboid, a cylinder, a sphere, or some other suitable shape.

In these illustrative examples, volume 219 is for at least a portion of a part in parts 106 of object 102. Volume 219 may be large enough to encompass the part. Volume 219 may also be larger than the part. In these illustrative examples, volume 219 may comprise an amount of space around the part for viewing the part in a graphical user interface. For example, the amount of space around the part may be for viewing the part in the graphical user interface from one or more angles. In this example, the one or more angles may be one or more angles from the point of view of an operator. In this example, the point of view of the operator may be of an operator performing a task associated with the part.

As depicted, volumes 218 may be identified in model 216 using volume database 220. Volume database 220 is a collection of information that may be used to identify which volumes in volumes 218 may be displayed as graphical representations 214. In particular, the collection of information may include volume identifiers 221. For example, volume identifier 222 in volume identifiers 221 may define volume 219 in volumes 218.

In these illustrative examples, an identification of volume 219 may be made using sectional view 223 in sectional views 224 in sectional view database 225. Sectional views 224 may include sectional views of the different objects. For example, sectional view 223 may correspond to model 216. An operator may select volumes 218 using sectional view 223 displayed on graphical user interface 208 in this particular example.

As depicted, sectional views 224 in sectional view database 225 may provide views of sections 136 for object 102. In the illustrative examples, sections 136 correspond to sections manufactured for assembly of object 102. In particular, sections 136 may correspond to sections manufactured for assembly of aircraft 104.

Further, sectional views 224 may include different levels of detail. For example, sectional views 224 may include a hierarchy of levels in which the lower levels have more detail about aircraft 104 than higher levels in the hierarchy. In some illustrative examples, a selection of a sectional view in sectional views 224 may result in another sectional view being displayed. In other illustrative examples, a selection made in a sectional view may result in graphical representations 214 being generated from model 216 and displayed on graphical user interface 208. In this manner, an operator may visually query aircraft 104 through the different sectional views in sectional views 224.

As a result, operator interaction generating user input with sectional view 223 displayed in graphical user interface 208 may be used to identify volumes 218 in model 216. The user input may be used to identify volume identifier 222 from volume identifiers 221. Volume identifier 222 may point to volume 219 in model 216.

In these illustrative examples, object visualizer 204 may generate queries using volume identifiers 221 to obtain information from model 216 in model database 215. In particular, the information may be data about volume 219 in model 216 for aircraft 104.

As depicted, object visualizer 204 also may be configured to generate graphical representations 214 for states 226 of object 102. In these illustrative examples, states 226 may be used for object 102 in the form of aircraft 104. In other words, aircraft 104 may have different parts in parts 106 that are installed at different states within states 226. In the illustrative examples, states 226 may take the form of conditions of assembly 227 for object 102.

For example, states 226 may be based on positions 114 of aircraft 104 within assembly location 107 in building 108 in FIG. 1. In these illustrative examples, states 226 may be selected from at least one of planned states 228 or actual states 229.

Aircraft 104 may have different planned states in planned states 228 in different positions in positions 114. In this illustrative example, a planned state in planned states 228 includes the parts that are expected to be installed at a particular position in positions 114. In other words, these parts may or may not have been installed at that position.

In these illustrative examples, the planned state may be based on the past position, current position, or the future position of aircraft 104 in positions 114. In other words, graphical representations 214 may be generated for any position that has occurred, is currently present, or planned for aircraft 104.

As depicted, an actual state in actual states 229 includes parts 106 that have actually been installed in aircraft 104. In other words, a particular state may have a selected number of parts that are installed at that state. The actual state in actual states 229 may be based on at least one of a past position, or the current position of aircraft 104. In other words, graphical representations 214 may be generated for parts 106 actually installed at a prior point in time. This prior point in time may be selected by an operator. In this manner, an operator may view tasks 118 performed to install parts 106 at some prior point in time.

Additionally, the actual state may be the current state of aircraft 104. In other words, graphical representations 214 may be generated for parts 106 that have been installed at the current point in time. In this manner, graphical representations 214 may be used to visualize parts 106 that are currently present in aircraft 104.

In these illustrative examples, the identification of parts that have already been installed or parts installed in prior points in time may be identified using shop order instances 132 in shop order database 212. In particular, shop order instances 132 may indicate what parts in parts 106 have been installed.

Model database 215 is a database of models for objects. In these illustrative examples, these models may be, for example, computer-aided design models (CAD). Of course, any type of model that may provide information about the three-dimensional geometries of objects may be used. Additionally, these models may also include other information about materials, instruction assemblies, or other suitable types of information.

As depicted, inventory identifier 206 is configured to access inventory database 230. Inventory database 230 contains information about parts. Inventory database 230 may include information about whether parts are in stock, when parts will be delivered, the number of parts available, or other suitable types of information.

As depicted, status identifier 207 is configured to provide a visualization of the status for one or more of shop order instances 132. In this illustrative example, status identifier 207 is configured to provide an operator a graphical front end through graphical user interface 208 to identify the status of a shop order instance in a specific location of object 102, such as aircraft 104. This information may be identified without the operator knowing the coordinates of the particular location.

In these illustrative examples, object visualizer 204 is configured to identify a model of object 102, such as aircraft 104. For example, object visualizer 204 may identify the model in model database 215 for object 102.

Status identifier 207 is also configured to identify shop order instances 132 for object 102. The identification may be made through interaction with assignment manager 202.

In the illustrative example, status identifier 207 is also configured to identify status 213 of shop order instances 132. This identification also may be made through assignment manager 202.

Object visualizer 204 is configured to display graphical representations 214 of parts 106 in FIG. 1 for a group of shop order instances 132 in graphical user interface 208 on a display device in display system 209. The generation of graphical representations 214 may be based on the identification of a group of shop order instances 132. In other words, object visualizer 204 is configured to receive an identification of parts in the group of shop order instances 132. The identification of these parts may be used to generate graphical representations 214.

Further, status identifier 207 is also configured to display a set of graphical indicators 231 in association with graphical representations 214 of parts 106 displayed on graphical user interface 208 by object visualizer 204. As used herein, a "set of," when used with reference items, means one or more items. For example, a set of graphical indicators 231 is one or more of graphical indicators 231.

In these illustrative examples, a graphical indicator in graphical indicators 231 is considered to be displayed in association with a graphical representation in graphical representations 214 when the attention of an operator viewing graphical indicators 231 is drawn to the parts. Thus, the graphical indicator may be displayed as part of the graphical representation, on the graphical representation, in some proximity of the graphical representation, or in some other suitable manner that draws attention to the graphical representation.

The set of graphical indicators 231 displayed in association with graphical representations 214 of parts 106 may take different forms. For example, the set of graphical indicators 231 may be selected from at least one of a color, cross hatching, an icon, highlighting, animation, or other suitable types of graphical indicators.

Further, the group of shop order instances 132 may be identified in a number of different ways. For example, the group of shop order instances 132 may be identified by a user input to graphical user interface 208 from an operator. For example, the user input received may be a selection of the group of shop order instances 132.

In another illustrative example, the identification of the group of shop order instances 132 may be identified from a user input selecting a group of parts 106 in object 102 in FIG. 1. The selection of the group of parts 106 may be one of a selection of the group of parts 106 from a list of parts 106 and a selection of the group of parts 106 from a display of graphical representations 214 of parts 106 in graphical user interface 208.

Additionally, status identifier 207 may display information about a shop order instance for a part selected from graphical representations 214 of parts 106 displayed in graphical user interface 208.

With this information in graphical user interface 208, real-world operations may be performed. For example, the assembly of object 102 in FIG. 1 may be managed based on graphical representations 214 of parts 106 for shop order instances 132 and the set of graphical indicators 231 displayed on graphical user interface 208. For example, identifications of operations that should be performed may be made using this visualization. These operations may include when particular parts should be assembled, when inspections of parts assembled in object 102 should be made, or other suitable types of operations.

Further, object manager 124 also may include aircraft comparator 236. Aircraft comparator 236 and object visualizer 204 may be components within aircraft build comparison system 138 in FIG. 1. In this illustrative example, aircraft comparator 236 may identify first model 238 in models 217 for a first aircraft, such as aircraft 104. Additionally, aircraft comparator 236 may identify second model 240 in models 217 for a second aircraft, such as aircraft 140 in FIG. 1. In this illustrative example, aircraft 140 may be a prior build of the same model of aircraft 104. Aircraft 140 may have different options from aircraft 104 in this particular example.

In this illustrative example, aircraft comparator 236 is configured to use model 216 in determining whether differences are present between aircraft 104 and aircraft 140. In this example, model 216 may be first model 238.

Aircraft comparator 236 is configured to compare first parts, such as parts 106 for aircraft 104, identified in first model 238 with second parts, such as parts 142, identified in second model 240 for aircraft 140 to generate comparison 244.

In this illustrative example, comparison 244 identifies difference 246 between parts 106 and parts 142. Difference 246 may be between at least one of the parts themselves, a configuration of the parts, or a location of the parts in the different aircraft.

In one illustrative example, difference 246 may be a difference between one or more of parts 106 for aircraft 104 and parts 142 for aircraft 140. Difference 246 may be for corresponding locations in aircraft 104 and aircraft 140 in which parts 106 and parts 142 are different in those corresponding locations. In these illustrative examples, a corresponding location between aircraft 104 and aircraft 140 is the same location in both aircraft 104 and aircraft 140. This location may be described using coordinates such as aircraft coordinates.

As depicted, aircraft comparator 236 may cause object visualizer 204 to display graphical representations 214 for parts 106 of aircraft 104 as well as parts 142 for aircraft 140. The display of these parts may be such that the difference between parts 106 and parts 142 from comparison 244 of parts 106 and parts 142 are illustrated through the display of these parts in graphical representations 214 within graphical user interface 208.

In this manner, the visualization of differences between different aircraft builds such as that for aircraft 104 and aircraft 140 may be presented visually to operators 122. In this illustrative example, this visualization is presented through graphical user interface 208 which may be displayed on display system 209.

Further, in one illustrative example, a group of graphical indicators 231 may be displayed in association with graphical representations 214 in graphical user interface 208. The group of graphical indicators 231 may be displayed by at least one of aircraft comparator 236 and object visualizer 204.

The group of graphical indicators 231 may be displayed on or otherwise in association with a group of parts in a location displayed by graphical user interface 208 for aircraft 104 and aircraft 140. This location is a corresponding location for aircraft 104 and aircraft 140.

The group of graphical indicators 231 may be displayed to indicate difference 246 between parts 106 in first model 238 and parts 142 in second model 240. In other words, the group of graphical indicators 231 may be used to draw the attention of operators 122 towards difference 246 between parts 106 and parts 142 as displayed using graphical representations 214 in graphical user interface 208.

As a result, operators 122 may learn the differences between those old options for aircraft 140 and the new options for aircraft 104 more easily with a visualization of the differences. The visualization of these differences may reduce the time and effort needed to learn assemblies for parts 106, assemble parts 106 or both when presented with different parts in parts 106 from parts 142 when assembling aircraft 104 after assembling aircraft 140. The visualization of these differences may be easier to understand and implement as compared to reviewing a change list or having no identification of changes between aircraft 104 and aircraft 140.

Thus, with a reduction in the time and effort needed to perform the assembly of aircraft 104, the expense for assembly of aircraft 104 may be reduced. Further, the throughput in assembling aircraft 104 and other aircraft may be increased. In other words the number of aircraft that may be produced in an assembly line over a given period of time may be increased.

In FIG. 2, different components are illustrated as being located in object manager 124. These different components may be used as part of different systems. The systems may include at least one of object visualization system 134 in FIG. 1, shop order status visualization system 135 in FIG. 1, or other suitable systems. A component in object manager 124 may be used in more than one system. For example, object visualizer 204 may be in both object visualization system 134 and shop order status visualization system 135. In other words, the different components illustrated in object manager 124 may be used at the same time by different systems in object manager 124.

Figure 3:
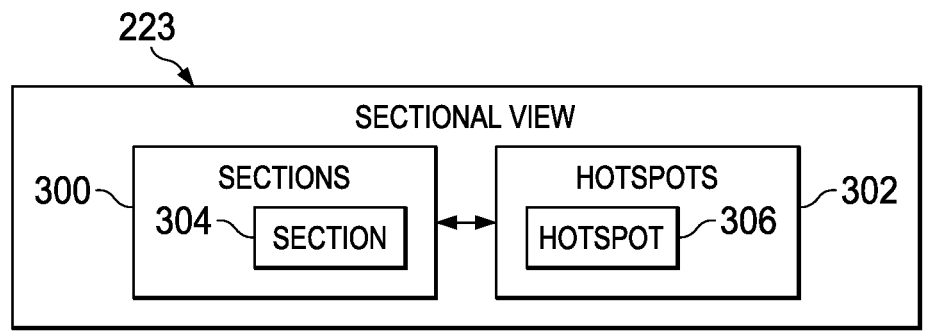
FIG. 3 is an illustration of a block diagram of a sectional view in accordance with an illustrative embodiment.

Turning now to FIG. 3, an illustration of a block diagram of a sectional view is depicted in accordance with an illustrative embodiment. An example of one implementation for sectional view 223 in FIG. 2 is shown.

As depicted, sectional view 223 includes a number of different pieces of information. For example, sectional view 223 includes sections 300 and hotspots 302.

Sections 300 are graphical representations corresponding to sections 136 for object 102 and, in particular, aircraft 104 in FIG. 1. In these illustrative examples, sections 300 may be located in a single image, multiple images, or some other suitable form. Further, sections 300 are graphical representations corresponding to sections 136 manufactured for assembly of aircraft 104.

In these illustrative examples, sections 300 may be selectable. A selection of section 304 in sections 300 having hotspot 306 in hotspots 302 results in a volume corresponding to section 304 in model 216 being displayed in this illustrative example. Hotspot 306 may be a pointer to volume identifier 222 associated with volume 219. For example, hotspot 306 may include a universal resource locator, or some other addressing convention to identify volume identifier 222 from volume identifiers 221 in volume database 220.

Figure 4:
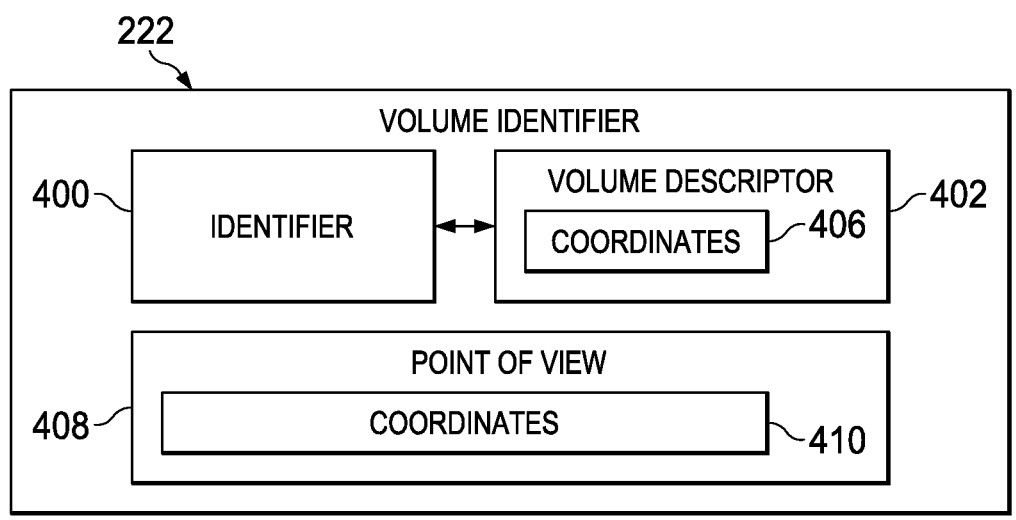
FIG. 4 is an illustration of a block diagram of a volume identifier in accordance with an illustrative embodiment.

Turning now to FIG. 4, an illustration of a block diagram of a volume identifier is depicted in accordance with an illustrative embodiment. In this illustrative example, one implementation for volume identifier 222 in FIG. 2 is shown.

Volume identifier 222 includes a number of components. As depicted, volume identifier 222 includes identifier 400 and volume descriptor 402.

Identifier 400 distinguishes volume identifier 222 from others of volume identifiers 221 that may be present in volume database 220. Identifier 400 may take various forms. For example, identifier 400 may be a word, a phrase, a number, an alphanumeric string, or some other suitable form.

Volume descriptor 402 describes the volume in model 216. For example, volume descriptor 402 may take the form of coordinates 406. Coordinates 406 are in the coordinate system used by model 216 in this example. For example, coordinates 406 may be three coordinates that may be used to define a polygon, a cube, or a cuboid. Of course, other information may be present in volume descriptor 402 other than coordinates 406. For example, volume descriptor 402 may include a single coordinate and a radius used to define volume 219 in a form of a sphere. In still other illustrative examples, a single coordinate may be present with pre-selected offsets that define volume 219 as a cube or some other shape.

In some illustrative examples, volume identifier 222 may also include point of view 408. Point of view 408 may define the view of the volume displayed to an operator when graphical representations 214 are displayed on graphical user interface 208 in FIG. 2. For example point of view 408 may include coordinates 410 of the point of view using the coordinate system for the volume.

With reference now to FIG. 5, an illustration of a block diagram of a shop order instance is depicted in accordance with an illustrative embodiment. As depicted, shop order instance 500 is an example of a shop order instance from shop order instances 132 in FIG. 1.

As depicted, shop order instance 500 may include a number of different parts. Shop order instance 500 includes identifier 502, classification 503, description 504, task 505, assigned operators 506, part identifier 508, location 510, instructions 512, and status 518.

As depicted, identifier 502 may be used to uniquely identify a task in tasks 118 in FIG. 1. Identifier 502 may be an alphanumeric identifier, a number, or some other suitable type of identifier.

In the illustrative example, classification 503 is used to classify the shop order instance. This classification may be based on the type of task to be performed. For example, the classifications may include seat installation, wiring, line replaceable unit installation, or other suitable types of classifications. The classification may be descriptive or may take the form of an identifier or other type of code.

Description 504 provides a description of task 505. This description may be a short description to provide the operator information about task 505. The description may be several words or a single sentence in some illustrative examples.

Task 505 identifies the work to be performed. For example, task 505 may be to install a part, assemble parts, perform an inspection, or some other suitable piece of work.

Assigned operators 506 identifies a group of operators that may be assigned to perform task 505. In some cases, an operator may not yet be assigned to perform task 505 for shop order instance 500.

In this illustrative example, part identifier 508 identifies a part assembled in object 102 using shop order instance 500. In this illustrative example, part identifier 508 is a part number for the part. For example, part identifier 508 may be a serial number, a combination of a serial number and vendor identifier, or some other suitable type of identification that uniquely identifies a particular part from other parts even if those parts are the same type.

In the illustrative examples, part identifier 508 may be used to generate the graphical representation of the parts identified. For example, part identifier 508 may be used to locate the information in a model needed to generate the graphical representation of the part for display.

Location 510 identifies the location where task 505 is to be performed. This location may be in coordinates for object 102 or some other coordinate system.

Instructions 512 are a group of instructions for performing task 505. In particular, the group of instructions may be for assembling a group of parts. These instructions may be step-by-step instructions, guidance, or other suitable types of instructions. These instructions may provide guidance for assembling parts, inspecting parts, or other suitable operations that may be performed for task 505. Instructions 512 also may include plans for the location in which task 505 is to be performed.

As depicted, status 518 provides information about the performance of task 505 for shop order instance 500. In this illustrative example, the status may indicate that work is to be performed, has been completed, is in progress, is unassigned, has been planned, is on hold, has been canceled, or some other suitable status for shop order instance 500. The status may be indicated using text, codes, symbols, or other suitable mechanisms. Additionally, if status 518 indicates that the work to be performed has been completed, status 518 also may include a date and time of when work for performing task 505 occurred.

Turning next to FIG. 6, an illustration of a block diagram of a state for a section of an aircraft is depicted in accordance with an illustrative embodiment. In this depicted example, state 600 is an example of the state in states 226.

In this illustrative example, state 600 is a data structure that stores information about parts that may be present for state 600. This data structure may be, for example, a flat file, a linked list, a record in a database, or some other suitable type of data structure.

State 600 may take the form of planned state 602, actual state 604, or both. In these illustrative examples, state 600 may be condition of assembly 606 for a particular position of aircraft 104 in positions 114 in FIG. 1. In particular, condition of assembly 606 may be a condition of assembly in conditions of assembly 227 in FIG. 2.

In this illustrative example, state 600 includes parts 608. Parts 608 are parts present in aircraft 104 for state 600 selected for aircraft 104. As depicted, parts 608 may be identified using part identifiers 610. Part identifiers 610 may take various forms. For example, part identifier 612 in part identifiers 610 may be a part number for part 614 in parts 608. For example, part identifier 612 may be a serial number, a combination of a serial number and vendor identifier, or some other suitable type of identification. In the illustrative examples, part identifier 612 may be any identifier that uniquely identifies a particular part from other parts even if those parts are the same type.

In this illustrative example, state 600 may be used by object visualizer 204 in object manager 124 to generate graphical representations 214 for parts 608 that may be present for state 600. In these illustrative examples, state 600 represents a particular position of aircraft 104 in positions 114. As a result, only parts 608 present for aircraft 104 are displayed in graphical representations 214 on graphical user interface 208.

With reference now to FIG. 7, an illustration of a block diagram of a unique parts list is depicted in accordance with an illustrative embodiment. Unique parts list 700 is an example of one implementation for comparison 244 in FIG. 2. Unique parts list 700 may identify difference 246 between parts in different aircraft in corresponding locations.

As illustrated, unique parts list 700 lists a group of first parts 702 and a group of second parts 704 in which a difference between those parts has been identified for locations 706. For example, first part 708 for a first aircraft in location 710 is different from second part 712 for a second aircraft in location 710. Location 710 is the same for both aircraft in making the comparison. Location 710 may be a corresponding location for first part 708 and second part 712.

For example, first part 708 in location 710 may be a closet in the first aircraft. Second part 712 in location 710 may be a lavatory in the second aircraft. In this example, first part 708 and second part 712 are assemblies of components.

In another illustrative example, first part 708 may be a first type of latch for a door, while second part 712 may be a second type of latch for the door. In yet another illustrative example, first part 708 may be a latch having a first color, while second part 712 may be the same type of latch having a second color.

Unique parts list 700 may be used to generate graphical representations 214 for visualizing difference 246 in a manner that aids operators 122 in assembling aircraft 104. The visualization of difference 246 between the current build of aircraft 104 and the prior build of aircraft 140 may allow operators 122 to more quickly familiarize themselves with tasks 118 to be performed for shop order instances 132 to assemble the current build of aircraft 104.

Further, these visualizations may be made based on states 226 for operators 122 that may perform tasks 118 in different positions in positions 114. In other words, the visualization may be based on a condition of assembly that may be a current condition of assembly or one expected for a particular position in which tasks 118 are to be performed.

The illustration of the different components that may be used in manufacturing environment 100 in FIGS. 1-7 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment. For example, although the illustrative examples are described with respect to an aircraft, an illustrative embodiment may be applied to other objects other than aircraft, such as, for example, without limitation, a vehicle, a submarine, a personnel carrier, a tank, a train, an automobile, a bus, a spacecraft, a surface ship, a satellite, a rocket, an engine, a computer, harvesters, construction cranes, bulldozers, mining equipment, or other suitable types of objects.

In another illustrative example, a selection of section 304 with hotspot 306 may result in an inquiry being generated directly without using volume database 220. For example, hotspot 306 may include a query for the volume corresponding to section 304.

As another illustrative example, aircraft comparator 236 may be a block within object visualizer 204. In yet other illustrative examples, object visualizer 204 may be components within aircraft comparator 236.

As yet another illustrative example, other numbers of models may be compared other than first model 238 and second model 240 to form comparison 244. For example, one or more additional models in model database 215 may be selected for comparison by aircraft comparator 236 in generating comparison 244.

With reference now to FIGS. 8-11, illustrations of the display of graphical user interfaces for graphically selecting models of aircraft for comparison are depicted in accordance with an illustrative embodiment. These figures illustrate one manner in which graphical user interface 208 in FIG. 2 may be implemented. The different graphical user interfaces may be displayed on a display system, such as display system 209 in FIG. 2, and an operator may interact with the graphical user interfaces using an input system, such as input system 211 in FIG. 2.

Figure 8:
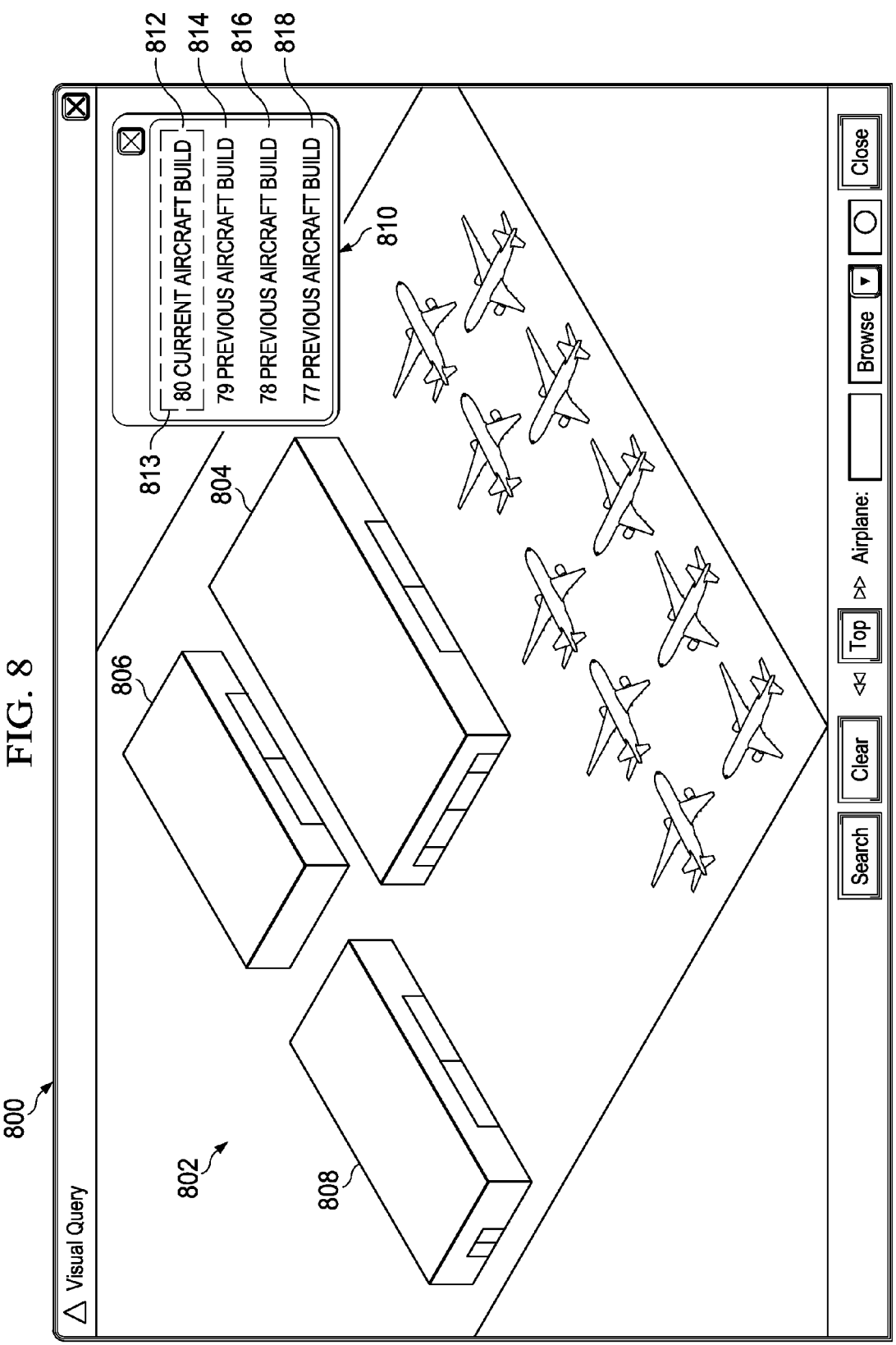
FIG. 8 is an illustration of a graphical user interface for identifying a model of an aircraft for viewing in accordance with an illustrative embodiment.

With reference to FIG. 8, an illustration of a graphical user interface for identifying a model of an aircraft for viewing is depicted in accordance with an illustrative embodiment. In this illustrative example, graphical user interface 800 displays buildings 802 including building 804, building 806, and building 808.

In this particular example, each building in buildings 802 in graphical user interface 800 represents a location where manufacturing of aircraft occurs. Each building may correspond to a database of aircraft that are manufactured within the building. In these illustrative examples, the database may be a database of models for a particular type of aircraft. In other words, the different models in the database may be of the same type but may have slight variations such as customer options. These models may represent aircraft builds to be performed as well as already performed aircraft builds for existing aircraft.

For example, the database may be model database 215 in which models 217 are for the same type of aircraft. Different models, such as first model 238 and second model 240 may have different customer options in this particular example.

A selection of models may be made in a number of different ways. In this illustrative, a selection of building 804 may result in selection of a database corresponding to the type of aircraft being assembled and building 804 being selected. Further, the first model for the first aircraft for assembly may be selected based on the selection of building 804. In other words, the first model may be identified from an aircraft currently being assembled or to be assembled in building 804. A second model from the models in the database may be selected using menu 810. In this example, one or more models may be selected from the items to perform a comparison with the first model identified from the selection of building 804.

In this illustrative example, item 812 corresponds to the model in the database for an aircraft build for aircraft currently being assembled in the assembly line in building 804. In this example, item 812 is shown with highlighting 813 based on the selection of building 804.

As depicted in this example, item 814, item 816, and item 818 correspond to models in the database for previous aircraft builds for aircraft already assembled in the assembly line in building 804. In this example, two or more models may be selected from the items to perform a comparison.

Of course, in other illustrative examples, the selection of building 804 may merely display menu 810 without selecting the model of the aircraft currently being assembled. In this implementation, user input may be received to select item 812 for the model of aircraft for assembly in building 804.

Figure 9:
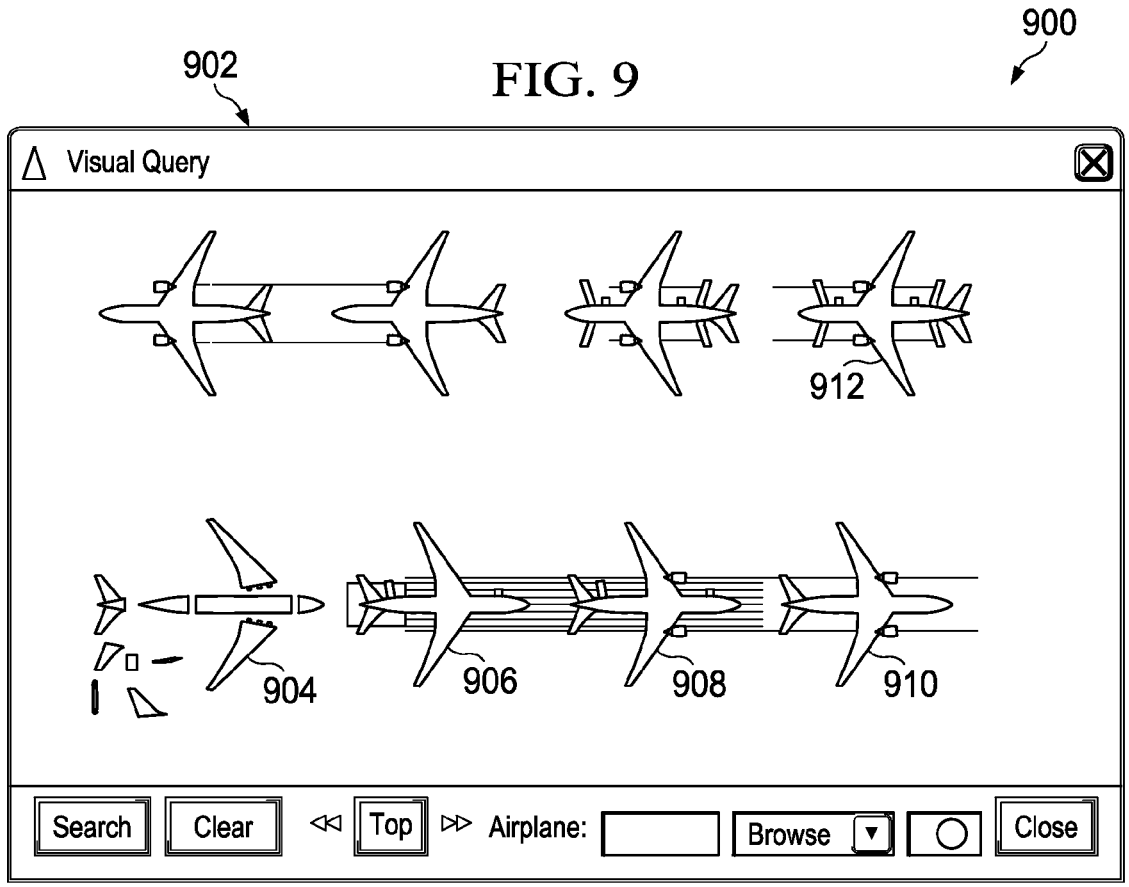
FIG. 9 is an illustration of a graphical user interface of aircraft positions in a building in accordance with an illustrative embodiment.

Turning now to FIG. 9, an illustration of a graphical user interface of aircraft positions in a building is depicted in accordance with an illustrative embodiment. In this illustrative example, aircraft positions 900 are displayed in graphical user interface 902. These positions correspond to tasks that may be performed at different stages of the assembly of an aircraft.

In this particular example, aircraft positions 900 include position 904, position 906, position 908, position 910, and position 912. In these illustrative examples, certain tasks are performed in different positions in aircraft positions 900. In other words, the aircraft assembly progresses from position to position with different parts being added to the aircraft at the different positions in aircraft positions 900.

A selection of one of these positions results in identifying graphical representations for parts that would be installed at a particular position as well as any parts that may have been installed from a prior position. As a result, parts that are not to be installed into a subsequent position are not present. For example, an aircraft in position 912 is a fully configured aircraft. An aircraft in position 910 may not have seats and carpet. An aircraft in position 908 may not include stove ends, lavatories, galleys, and other parts. These different positions in aircraft positions 900 may have different conditions of assembly for the aircraft in these illustrative examples.

In these illustrative examples, each of these positions may have models associated with the position. These models may contain the parts that are present in the aircraft for a particular position. As a result, a selection of a position results in a selection of models that may be used to display graphical representations of parts. As a result, models for positions with fewer parts may be queried more quickly to identify information to generate graphical representations of parts for the aircraft.

Figure 10:
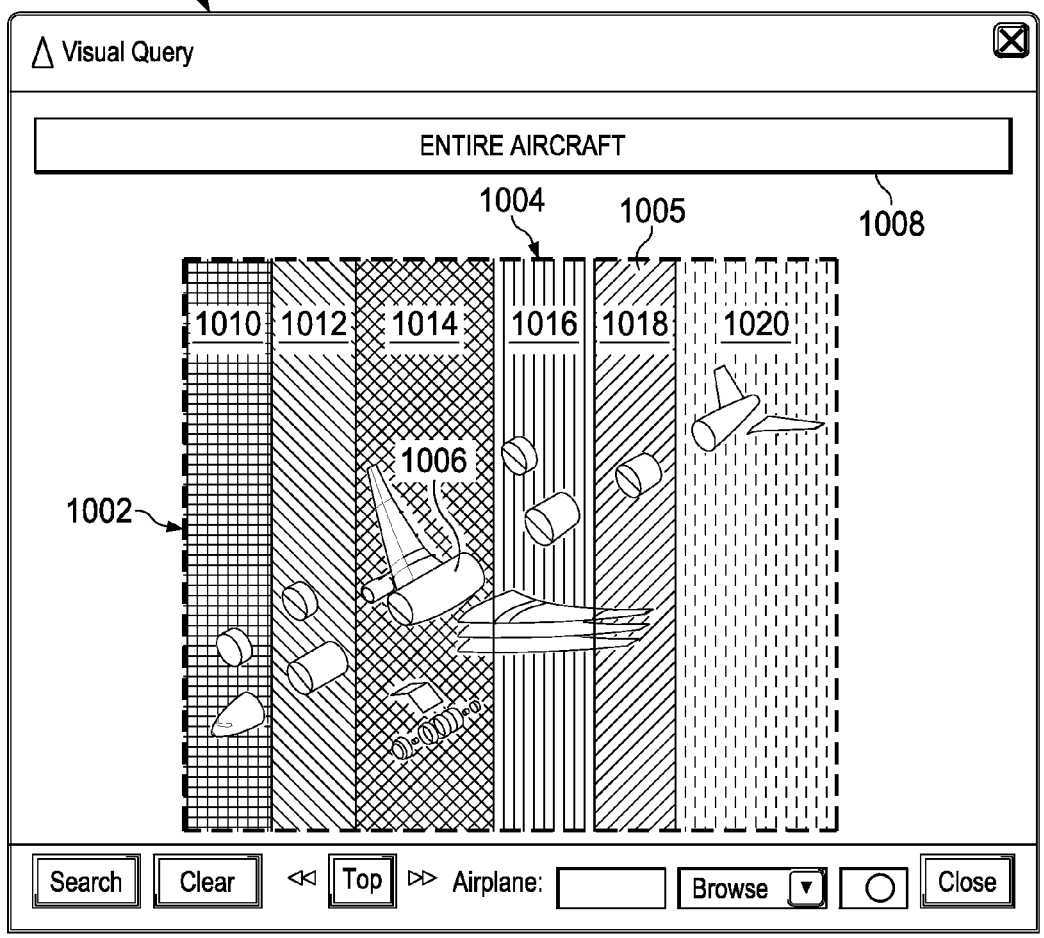
FIG. 10 is an illustration of a graphical user interface of aircraft sections in accordance with an illustrative embodiment.

Turning now to FIG. 10, an illustration of a graphical user interface of aircraft sections is depicted in accordance with an illustrative embodiment. In this illustrative example, graphical user interface 1000 displays sections 1002 for an aircraft in area 1004 of graphical user interface 1000.

As depicted, sectional view 1005 is displayed in area 1004 of graphical user interface 1000. Sectional view 1005 is an example of one implementation for sectional view 223 shown in block form in FIG. 2 and FIG. 3. In this particular example, sectional view 1005 may be for an aircraft in position 912 in FIG. 9.

An operator may select a section from sections 1002. As depicted, sections 1002 are examples of sections 300 in FIG. 3 as displayed in graphical user interface 1000. Sections 1002 are selectable in this particular example. In other words, sections 1002 may include hotspots. These hotspots are not seen in this illustrative example. Hotspots are areas in graphical user interface 1000 that may be selected to cause an action. In these illustrative examples, these hotspots correspond to sections 1002. The hotspots may encompass sections 1002 or may be around sections 1002 or some combination thereof.

As another example, section 1006 is an example of a section in sections 1002 that may be selected. A selection of this section results in a more detailed illustration of section 1006 being displayed. In this example, section 1006 is an upper barrel portion of an aircraft.

Additionally, an identification of the parts present in the section is also made in response to the user selection of a particular section. This identification may include any parts that are present for the particular position of the aircraft in that section. In other words, the same section of an aircraft in different positions may have different parts that are present based on tasks for installing parts. This identification may be made through the use of states 226 in FIG. 2.

In the illustrative example, an operator may select to view the entire aircraft by selecting entire aircraft area 1008 in graphical user interface 1000. In other words, the volume for display may be the entire aircraft. Further, an operator may select groups of sections 1002. As depicted, the selection may be made by selecting one of area 1010, area 1012, area 1014, area 1016, area 1018, and area 1020 in graphical user interface 1000. In these illustrative examples, these areas have hotspots. In this manner, an operator may view different portions of an aircraft in a manner that suits the particular query that is the operator desires.

Figure 11:
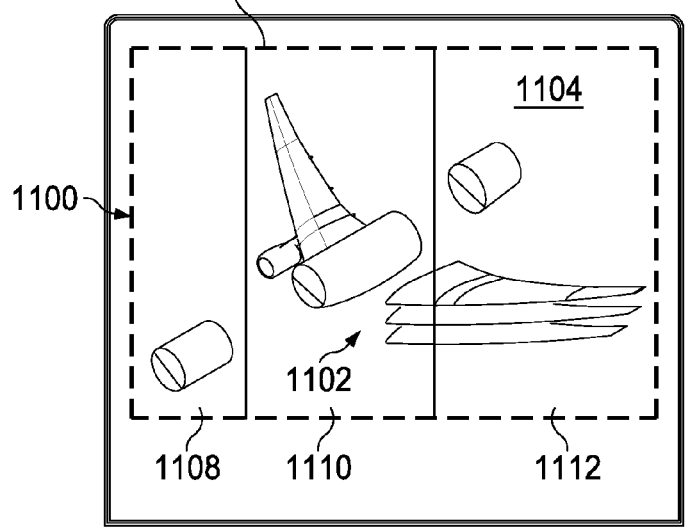
FIG. 11 is an illustration of a graphical user interface of aircraft sections in accordance with an illustrative embodiment.

Turning now to FIG. 11, an illustration of a graphical user interface of aircraft sections is depicted in accordance with an illustrative embodiment. In this illustrative example, graphical user interface 1100 displays sections 1102 for an aircraft in area 1104 of graphical user interface 1100.

As depicted, sectional view 1105 is displayed in area 1104 of graphical user interface 1100. Sectional view 1105 is an example of one implementation for sectional view 223 shown in block form in FIG. 2 and FIG. 3. In this particular example, sectional view 1105 may be for an aircraft in position 904 in FIG. 9.

In this illustrative example, only a portion of an aircraft is illustrated in the view of sections 1102 in sectional view 1105. As depicted, only sections 1102 that are present in a particular position are shown in this particular example.

Further, sections 1102 also may be selectable. The selectable ability of sections 1102 may be enabled through the use of hotspots associated with sections 1102. As a result, the selection of a particular section in sections 1102 may result in the display of the volume from a model of aircraft containing the selected section.

As depicted, area 1108, area 1110, and 1112 are also selectable. These areas may also have hotspots associated with them. The selection of one of these areas results in a volume containing the different sections within an area being displayed.

In the illustrative examples, the selection of one of the positions in the assembly line represented in graphical user interface 902 in FIG. 9, the selection of one of a section or an area in FIG. 10 or FIG. 11, or both the selection of a position in FIG. 9 and a selection or an area in FIG. 10 or FIG. 11 may be used to identify a particular location in which work may be performed by operators 122 on a shop floor in one of positions 114 in FIG. 1 graphically represented by aircraft positions 900 in graphical user interface 902 in FIG. 9. Additionally, the particular parts present for the aircraft in that position in the assembly line may be used to make comparisons to another aircraft with the same state. In other words, the other aircraft may have been built in the same assembly line at the same position. Comparison of the difference of parts present for that particular state of aircraft may be made in accordance with an illustrative embodiment. Of course, in some cases, the comparison may be made for all of the parts in both aircraft.

In other words, the visualization of the difference between parts 106 in aircraft 104 and parts 142 in aircraft 140 may be made based on states 226. In this manner, operators 122 performing operations at particular positions in positions 114 may more easily see the differences between the parts for a current build of aircraft 104 as compared to previous builds of aircraft 140 in this particular example.

The illustrations of graphical user interface 800 with buildings 802 in FIG. 8, graphical user interface 902 with aircraft positions 900 in FIG. 9, graphical user interface 1000 with sections 1002 in FIG. 10, and graphical user interface 1100 with sections 1102 in FIG. 11 are examples of multilevel querying that may be performed in accordance with an illustrative embodiment. As depicted, the selection of a building from buildings 802 may select a particular model for an aircraft. The particular model may be displayed with positions using graphical user interface 902. The selection of a position may result in another view being displayed with sections 1002 in graphical user interface 1000 or sections 1102 in graphical user interface 1100. In this manner, an operator may more easily traverse models of different aircraft, depending on the position selected.

In the illustrative examples, FIGS. 12-14 described below illustrate another manner in which models of aircraft may be selected for comparison in a graphical user interface. With reference to FIG. 12, an illustration of a graphical user interface for selecting a type of aircraft is depicted in accordance with an illustrative embodiment.

In this illustrative example, graphical user interface 1200 displays model menu 1202. Model menu 1202 includes item 1204, item 1206, item 1208, and item 1210. As depicted, each of these items represents a particular type of aircraft.

Selection of one of these items may select a database of models for the particular type of aircraft. This database may be, for example, model database 215 in FIG. 2.

Turning next to FIG. 13, an illustration of a graphical user interface for selecting a model of an aircraft is depicted in accordance with an illustrative embodiment. As depicted, window 1300 is displayed in graphical user interface 1200. Window 1300 may be used to select models of a particular type of aircraft for comparison.

As depicted, window 1300 displays entries for selection. The entries include entry 1302, entry 1304, entry 1306, entry 1308, and 1310, entry 1312, entry 1314, and entry 1316. Each of these entries represents a model for the same type of aircraft. In the illustrative example, a type of aircraft may be, for example, a Boeing 777, a Boeing 727, or some other type of aircraft. As described above, the model represents parts for an aircraft that has actually been assembled, an aircraft to be assembled, an aircraft in a planning state for assembly, or in some other phase of development.

Figure 14:
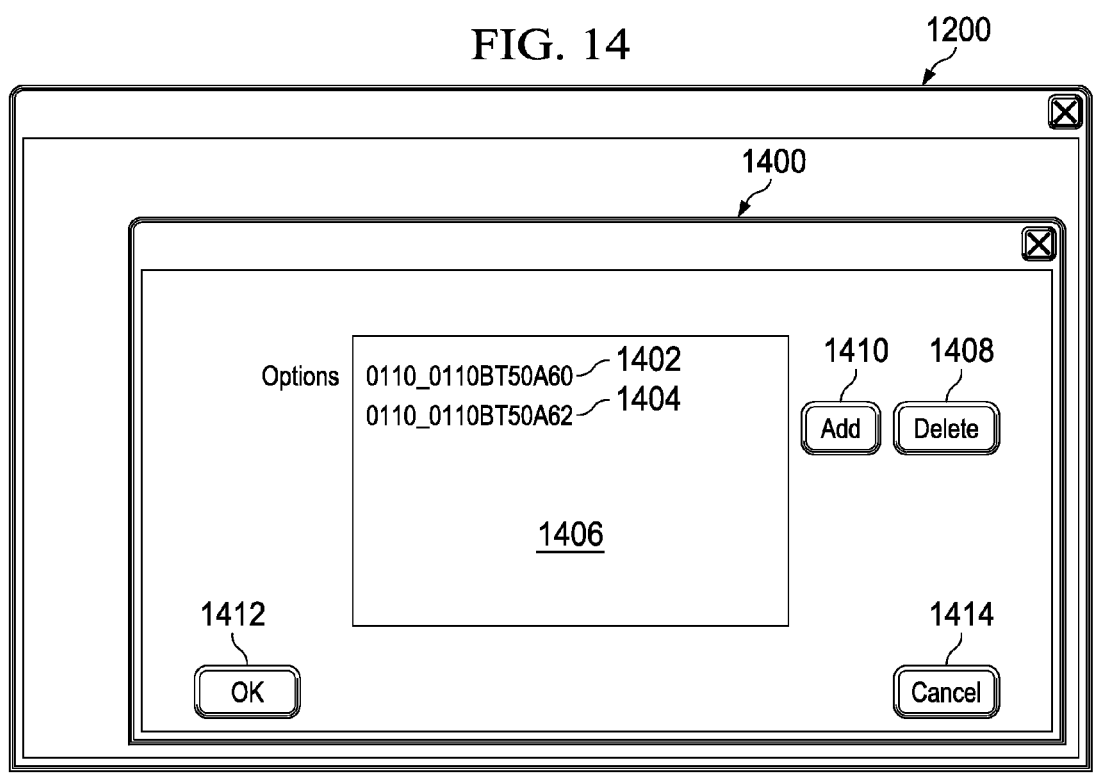
FIG. 14 is an illustration of a graphical user interface for confirming a selection of models for comparison in accordance with an illustrative embodiment.

With reference now to FIG. 14, an illustration of a graphical user interface for confirming a selection of models for comparison is depicted in accordance with an illustrative embodiment. In this illustrative example, graphical user interface 1200 includes window 1400. Window 1400 shows the selection of model 1402 and model 1404 for comparison in field 1406 of window 1400.

In this illustrative example, only two models are shown as being selected. These models may be deleted by the selection of delete button 1408 if the models are not the desired models for comparison. Add button 1410 may be used to add additional models. In other words, more than two models may be compared depending on the particular implementation.

When the models listed in field 1406 are the ones desired for comparison, user input may be received selecting okay button 1412. User input selecting this button causes aircraft comparator 236 to retrieve and compare the models identified in field 1406 to form comparison 244 in FIG. 2. User input also may be selected to cancel the selection by selecting cancel button 1414 in window 1400.

The illustration of graphical user interface 1200 in FIGS. 12-14 are not meant to imply limitations to the manner in which models may be selected for comparison. Other types of graphical user interfaces may be used other than the ones illustrated in these figures.

Figure 15:
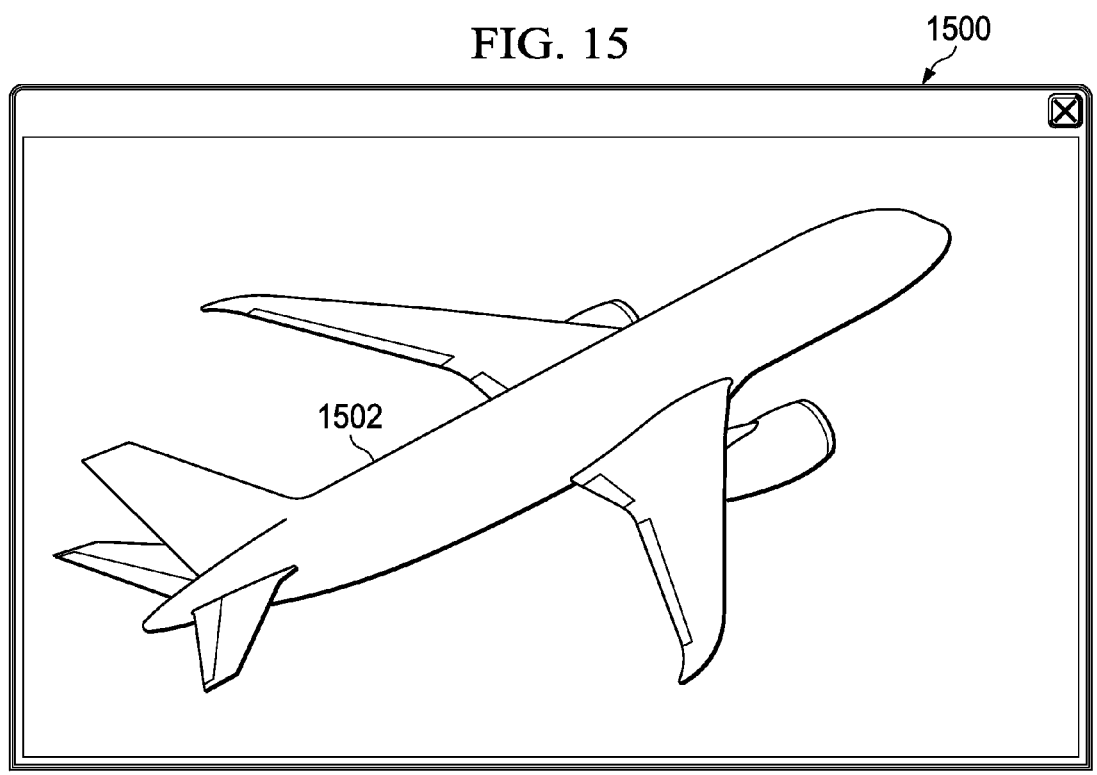
FIG. 15 is an illustration of a model of an aircraft displayed in a graphical user interface in accordance with an illustrative embodiment.

Turning now to FIG. 15, an illustration of a model of an aircraft displayed in a graphical user interface is depicted in accordance with an illustrative embodiment. In this depicted example, graphical user interface 1500 displays model 1502 of an aircraft.

Figure 16:
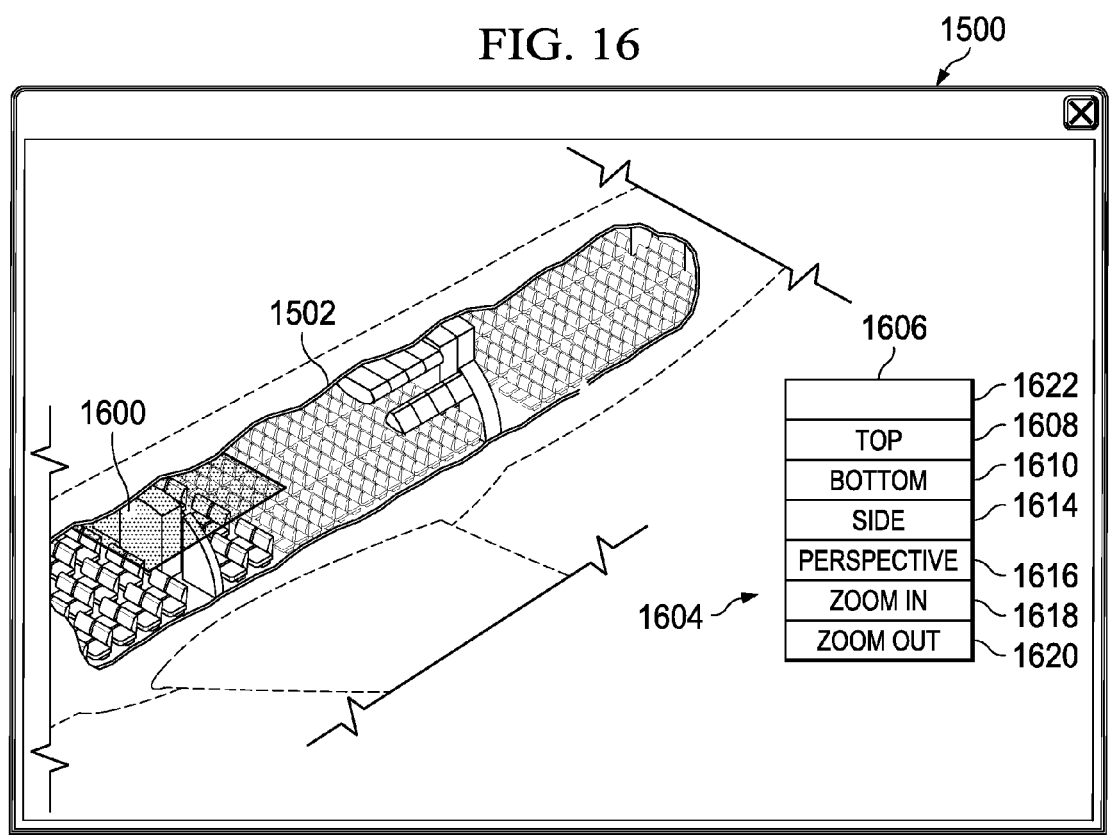
FIG. 16 is an illustration of differences between models in accordance with an illustrative embodiment.

In FIG. 16, an illustration of differences between models is depicted in accordance with an illustrative embodiment. In this illustrative example, model 1502 as displayed in graphical user interface 1500 displays the difference between model 1502 and another model compared with model 1502.

As can be seen in this display, portion 1600 of model 1502 displayed in graphical user interface 1500 is the portion of model 1502 that includes differences from the comparison of model 1502 with another model. From this view, portion 1600 may be viewed at different levels of detail.

For example, user input may receive a part or volume in portion 1600 of model 1502 as displayed in FIG. 16. In this illustrative example, the user input may be received through menu 1604. Menu 1604 may be used to traverse portion 1600 of model 1502 to reach a particular location in portion 1600 as displayed in graphical user interface 1500 in FIG. 15.

In this illustrative example, menu 1604 includes commands 1606. As depicted, commands 1606 include top 1608, bottom 1610, side 1614, perspective 1616, zoom in 1618, and zoom out 1620. In the illustrative example, top 1608, bottom 1610, side 1614, and perspective 1616 are used to display different views of model 1502.

For example, an operator may select a location in portion 1600. This location may be in the form of a set of coordinates, the part identifier, or some combination thereof. Then, the operator may select one of top 1608, bottom 1610, side 1614, and perspective 1616 to obtain a particular view of the selected portion.

In menu 1604, zoom in 1618 may be used to magnify a view. In contrast, zoom out 1620 may be used to reduce the size of a view.

In this illustrative example, field 1622 may be used to enter an identification of a part when portion 1600 are identified using parts in addition to or in place of volumes or other constructs.

Figure 17:
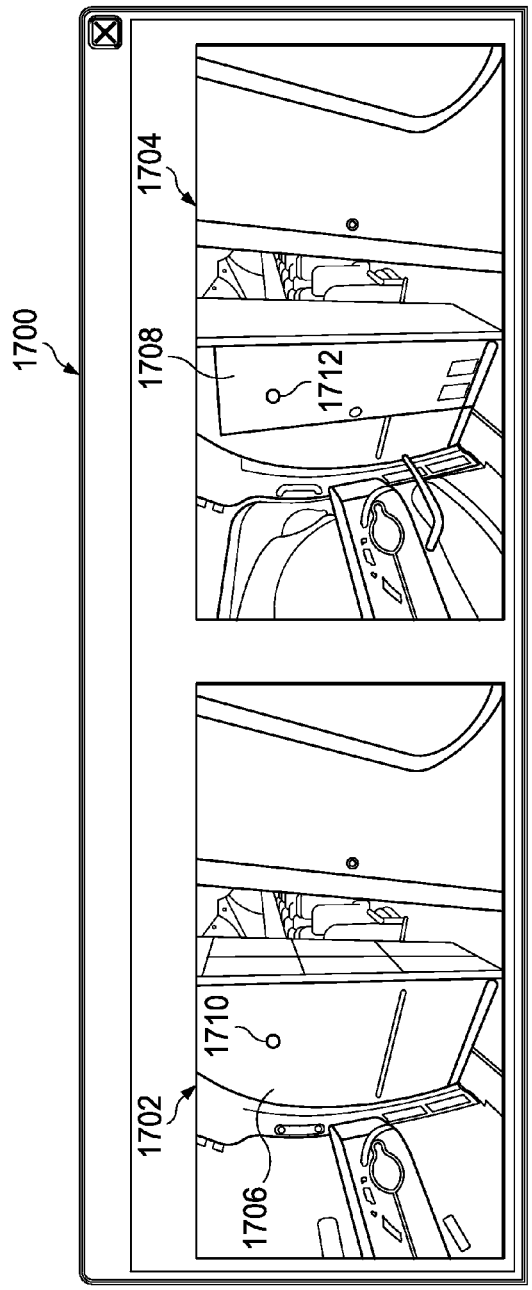
FIG. 17 is an illustration of a graphical user interface with a comparison of parts in accordance with an illustrative embodiment.
Figure 18:
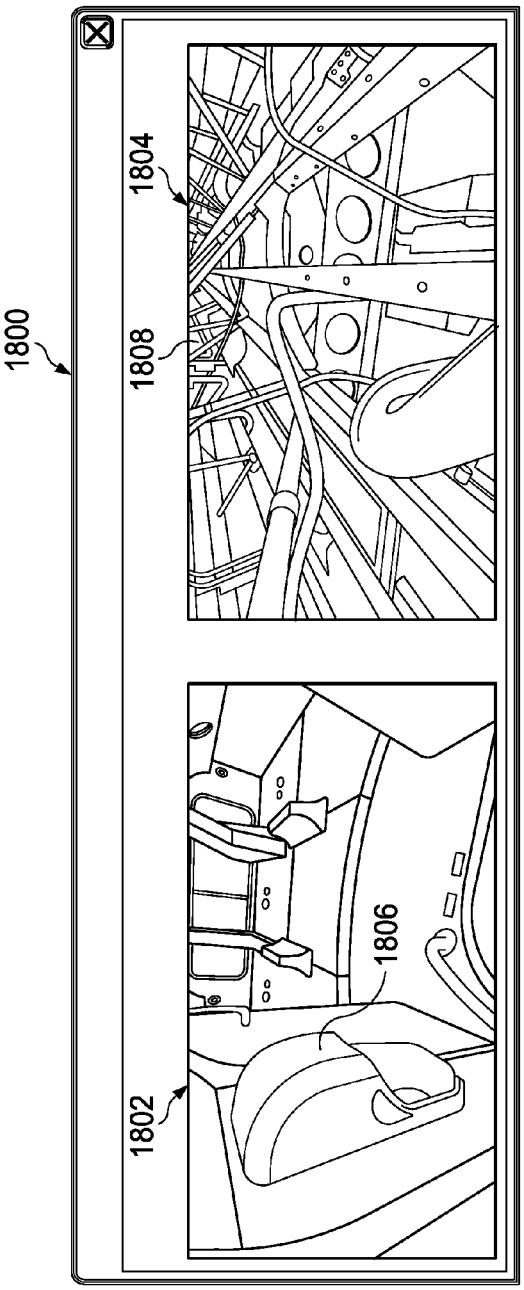
FIG. 18 is another illustration of a graphical user interface with a comparison of parts in accordance with an illustrative embodiment.
Figure 19:
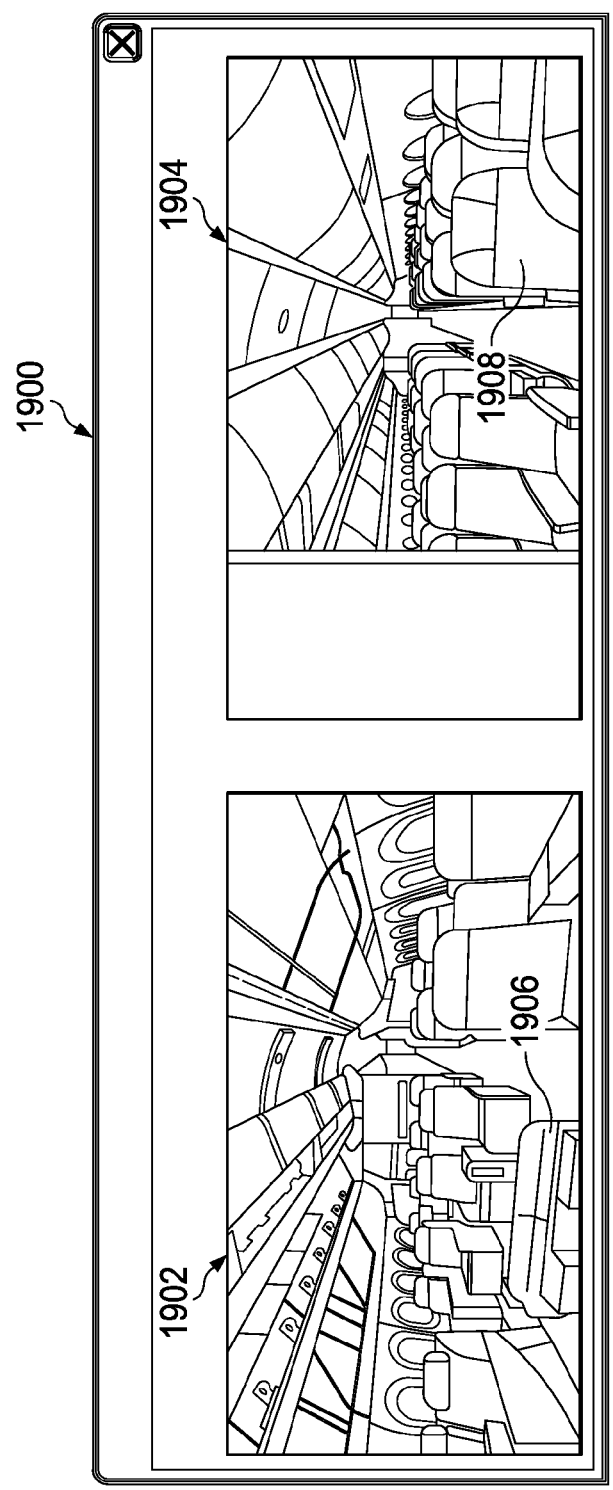
FIG. 19 is yet another illustration of a graphical user interface with a comparison of parts in accordance with an illustrative embodiment.

With reference next to FIGS. 17-19, illustrations of graphical user interfaces displaying comparisons of parts between models is depicted in accordance with an illustrative embodiment. The graphical user interfaces in these figures are examples of an implementation for graphical user interface 208 in FIG. 2.

In FIG. 17, an illustration of a graphical user interface with a comparison of parts is depicted in accordance with an illustrative embodiment. As depicted, graphical user interface 1700 displays a location in a first aircraft in window 1702 and a location in a second aircraft in window 1704. These two views are of the same location and are generated from models of two aircraft in the illustrative example. Further, these two views are from the same viewpoint in the illustrative example. Window 1702 and window 1704 may be displayed on the same display device or on different display devices depending on the particular implementation.

As illustrated, window 1702 and window 1704 are displayed side-by-side in this view. In this example, the location displayed in window 1702 and window 1704 are for the same location for the volumes in the models of the two aircraft. In other words, the location displayed in window 1702 corresponds to the location displayed in window 1704. This location may be described using the same aircraft coordinates for both models of the aircraft.

In this illustrative example, storage 1706 is displayed in window 1702. In the same corresponding location, lavatory 1708 is displayed in window 1704. In this manner, an operator may be able to more easily visualize differences between different builds of the same type of aircraft.

Further, in this particular example, graphical indicator 1710 is displayed in association with storage 1706 in window 1702. Graphical indicator 1712 is displayed in association with lavatory 1708 in window 1704. Graphical indicator 1710 and graphical indicator 1712 are used in this illustrative example to draw attention to the difference in the location displayed in these windows.

In this example, although graphical indicator 1710 and graphical indicator 1712 take the form of an icon, other types of graphical indicators may be used. For example, color, animation, tooltips, and other suitable types of graphical indicators may be used in addition to or in place of the icons used in these examples. If a tooltip is used, text may be included to identify the two different parts illustrated in this example.

With reference next to FIG. 18, another illustration of a graphical user interface with a comparison of parts is depicted in accordance with an illustrative embodiment. As depicted, graphical user interface 1800 displays a location in a first aircraft in window 1802 and the same corresponding location in a second aircraft in window 1804.

As can be seen in this example, sleeping compartment 1806 is shown in window 1802. Open area 1808 is shown in window 1804.

With reference to FIG. 19, yet another illustration of a graphical user interface with a comparison of parts is depicted in accordance with an illustrative embodiment. As depicted, graphical user interface 1900 displays a location in a first aircraft in window 1902 and the same location in a second aircraft in window 1904.

In this illustrative example, first seating configuration 1906 is shown in window 1902 and second seating configuration 1908 is shown in window 1904 for the same location in the two aircraft. The differences between the seating configurations between two different builds of aircraft may be visualized in this side-by-side display.

With the visualizations shown in the different illustrative examples, an understanding of differences in a current or new build in an aircraft as compared to a prior build may be made more easily by operators as compared to currently used techniques. This type of visualization may reduce the amount of time and training needed to understand the operations that are performed for tasks in assembling an aircraft.

FIGS. 15-19 are only intended as some illustrative examples of parts that may be displayed to provide a visualization of differences from a comparison of models of two aircraft of the same type. These examples are not meant to limit the manner in which an illustrative embodiment may be implemented. For example, although the different examples are displayed with reference to aircraft, similar displays may be used for other types of vehicles or objects. For example, the graphical user interfaces may be configured for sections of objects such as an automobile, a ship, a satellite, an engine, or some other suitable type of object.

For example, rather than a side-by-side view in FIGS. 17-19, the different windows may be displayed with one on top of the other. As yet another illustrative example, the parts displayed in different views may be based on a condition of assembly for the aircraft, the entire aircraft in its designed or completed form, or some combination thereof.

Figure 20:
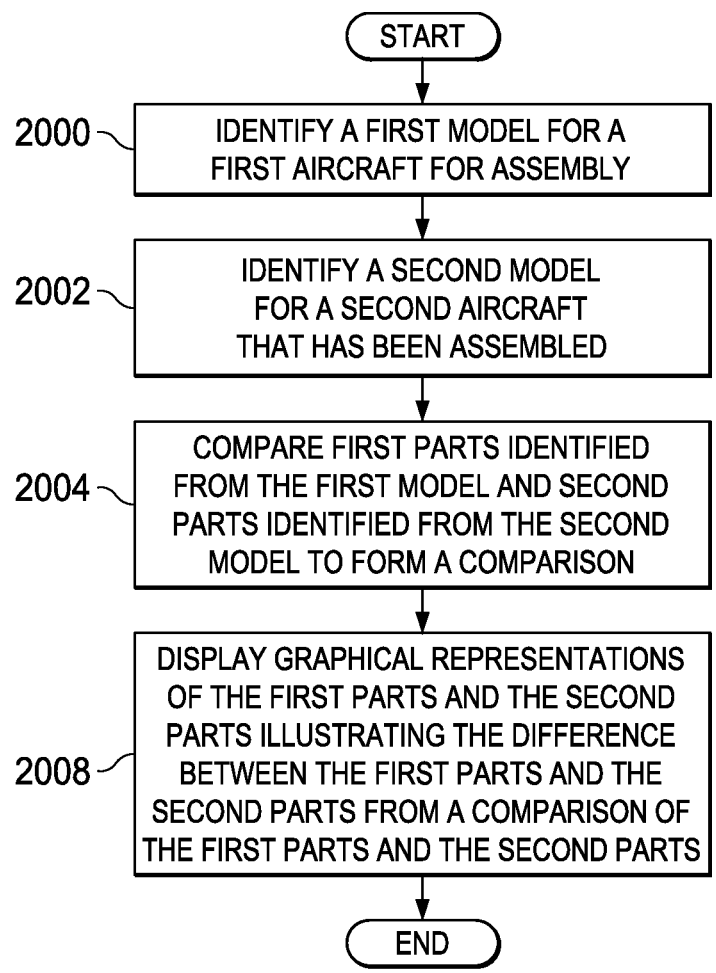
FIG. 20 is an illustration of a flowchart of a process for comparing aircraft parts in accordance with an illustrative embodiment.

Turning next to FIG. 20, an illustration of a flowchart of a process for comparing aircraft parts is depicted in accordance with an illustrative embodiment. The process illustrated FIG. 20 may be used to compare parts in different aircraft such as aircraft 104 and aircraft 140 in FIG. 1. The different operations may be implemented in object manager 124. In particular, one or more of the different operations in FIG. 20 may be implemented using aircraft comparator 236 in object manager 124.

The process begins by identifying a first model for a first aircraft for assembly (operation 2000). The process then identifies a second model for a second aircraft that has been assembled (operation 2002). First parts identified from the first model and second parts identified from the second model are compared to form comparison (operation 2004). The first parts and the second parts may be some or all of the parts in the first aircraft and the second aircraft.

The process then displays graphical representations of the first parts and the second parts illustrating the difference between the first parts and the second parts from a comparison of the first parts and the second parts (operation 2008), with the process terminating thereafter. This display of the difference may be used by operators to more quickly understand the manner in which the current aircraft should be assembled.

Figure 21:
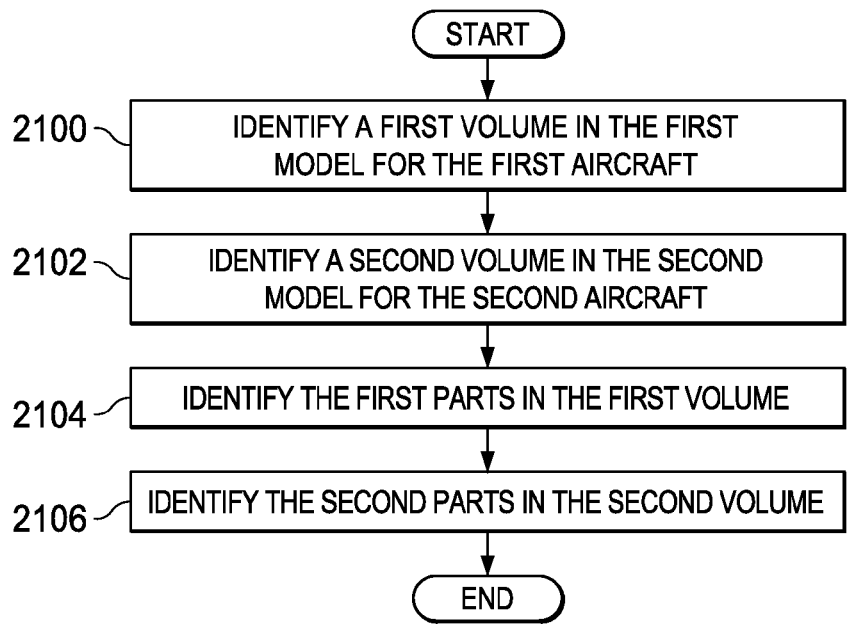
FIG. 21 is an illustration of a flowchart of a process for identifying first parts and second parts for comparison in accordance with an illustrative embodiment.

In FIG. 21, an illustration of a flowchart of a process for identifying first parts and second parts for comparison is depicted in accordance with an illustrative embodiment. The operations illustrated in FIG. 21 are an example of an implementation for operation 2004 in FIG. 20.

The process begins by identifying a first volume in the first model for the first aircraft (operation 2100). The process then identifies a second volume in the second model for the second aircraft (operation 2102). The second volume corresponds to the first volume. In other words, the second volume is based on the identification of the first volume. In these illustrative examples, the two volumes contain the same parts and may have the same dimensions.

The process then identifies the first parts in the first volume (operation 2104). The process then identifies the second parts in the second volume (operation 2106), with the process terminating thereafter.

Of course, in these illustrative examples, the parts may be identified from a user input selecting the volumes. These volumes may be a portion or all of an aircraft. In other illustrative examples, the parts may be identified from user input selecting the first parts from a list of parts. The second parts may be parts in the same locations as the first parts in these illustrative examples.

Figure 22:
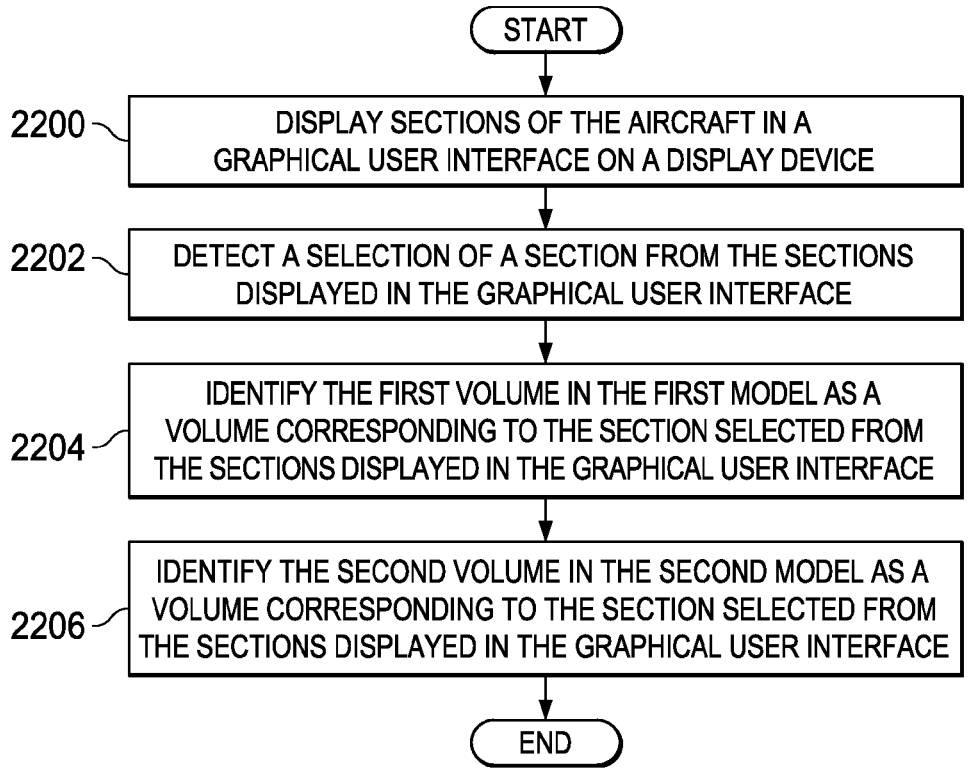
FIG. 22 is an illustration of a flowchart of a process for identifying volumes in models in accordance with an illustrative embodiment.

Turning now to FIG. 22, an illustration of a flowchart of a process for identifying volumes in models is depicted in accordance with an illustrative embodiment. This process is an example of one implementation for operation 2100 and operation 2102 in FIG. 21.

The process begins by displaying sections of the aircraft in a graphical user interface on a display device (operation 2200). The sections correspond to sections as manufactured for assembly of the aircraft and wherein the sections are selectable. The process then detects a selection of a section from the sections displayed in the graphical user interface (operation 2202).

Next, the process identifies the first volume in the first model as a volume corresponding to the section selected from the sections displayed in the graphical user interface (operation 2204).

The process then identifies the second volume in the second model as a volume corresponding to the section selected from the sections displayed in the graphical user interface (operation 2206). In the illustrative example, the second volume may be substantially identical to the first volume. In other words, the first volume and the second volume may be defined using the same coordinates for the type of aircraft. With the same coordinates, the parts encompassed within the first volume and the second volume may be different between the two aircraft. The process then terminates.

Figure 23:
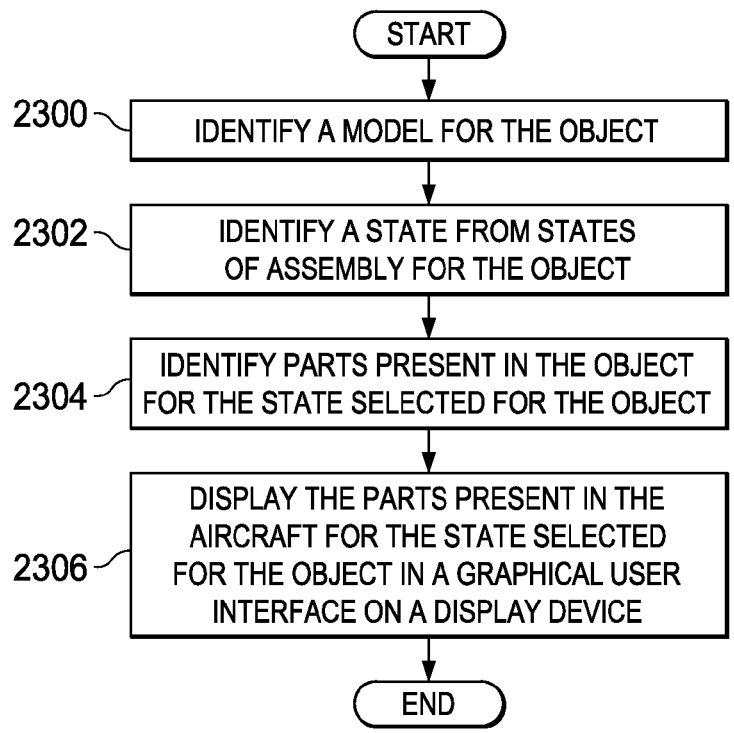
FIG. 23 is an illustration of a flowchart of a process to identify a state of an object in accordance with an illustrative embodiment.

With reference next to FIG. 23, an illustration of a flowchart of a process to identify a state of an object is depicted in accordance with an illustrative embodiment. In this illustrative example, the method may be used to visually query an object such as an aircraft. The process may be implemented using object manager 124 in FIG. 1. In particular, one or more of the different components for object manager 124 illustrated in FIG. 2 may be used to visually query an aircraft. In particular, this process may be located in object visualization system 134 in object manager 124 in FIG. 1. The process illustrated in this figure may be used to identify parts present in a portion of an aircraft identified as having differences from another aircraft in which the parts displayed are the ones that are present for a particular state of the aircraft. In these illustrative examples, the particular state may be a condition of assembly for the aircraft.

In these illustrative examples, the process may be used to identify a state of an object, such as aircraft. The state may be a condition of assembly.

The process begins by identifying a model for the object (operation 2300). In the illustrative examples, a model for the object may be identified in a number of ways as described above. For example, a model may be identified by selecting the model from a list of models. In other illustrative examples, the model may be identified visually using a graphical user interface such as graphical user interface 800 in FIG. 8.

Next, the process identifies a state from states of assembly for the object (operation 2302). In these illustrative examples, the state may be based on a position of the object within a manufacturing facility. In other illustrative examples, the state may be based on other criteria. For example, the criteria may be based on time in addition to or in place of the location of the aircraft. In these illustrative examples, the state may be a condition of assembly for the object.

The process then identifies parts present in the object for the state selected for the object (operation 2304). These parts are the parts that have been assembled for the aircraft in the particular state. As a result, pending the state selected, the object may have different parts for the state.

The process then displays the parts present in the aircraft for the state selected for the object in a graphical user interface on a display device (operation 2306), with the process terminating thereafter. In some illustrative examples, sections of aircraft are displayed with the parts present in the aircraft for the state selected in the graphical user interface. In other words, the display similar to graphical user interface 1000 may be used to display sections 1002. The sections correspond to sections manufactured for assembly of aircraft.

In other words, the sections displayed for the aircraft may vary depending on the state. For example, the state of the aircraft in graphical user interface 1000 in FIG. 10 is different from the state of the aircraft in graphical user interface 1100 in FIG. 11. The different sections may be present for different states. Additionally, within the same section, different parts may be present based on the parts that have been assembled so far.

Further, the sections also are selectable in the illustrative examples. The ability to select these sections may be provided through various mechanisms. In the illustrative example, the selectability may be provided through hotspots associated with the sections that are displayed in the graphical user interface. Further, the sections are displayed in an exploded view in operation 2306.

Figure 24:
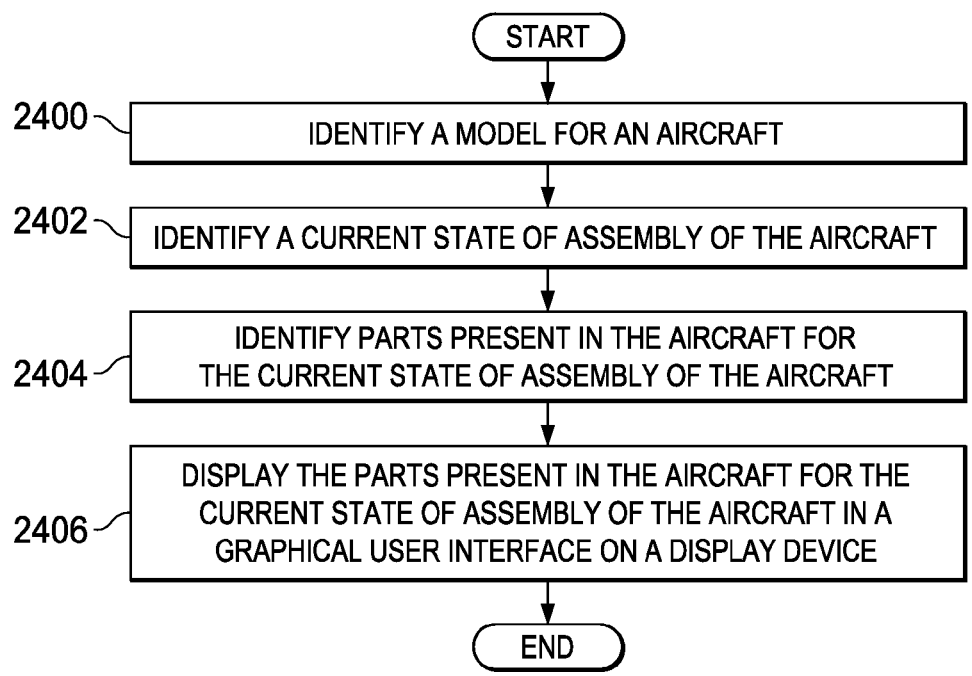
FIG. 24 is an illustration of a flowchart of a process for identifying a current state of an object in accordance with an illustrative embodiment.

With reference next to FIG. 24, an illustration of a flowchart of a process for identifying a current state of an object is depicted in accordance with an illustrative embodiment. In this illustrative example, the method may be used to visually query an object such as an aircraft to determine what parts have actually been assembled for the aircraft. The process may be implemented using object manager 124 in FIG. 1. In particular, one or more of the different components for object manager 124 illustrated in FIG. 2 may be used to visually query an aircraft.

In these illustrative examples, this current state may be based on a build cycle for the aircraft. The build cycle may be a particular position of the aircraft during its assembly. In these illustrative examples, the build cycle may be identified from shop order instances.

The process begins by identifying a model for an aircraft (operation 2400). The process then identifies a current state of assembly of the aircraft (operation 2402).

Thereafter, the process identifies parts present in the aircraft for the current state of assembly of the aircraft (operation 2404). The parts present in the aircraft for the current state of assembly of the aircraft are displayed in a graphical user interface on a display device (operation 2406), with the process terminating thereafter.

Figure 25:
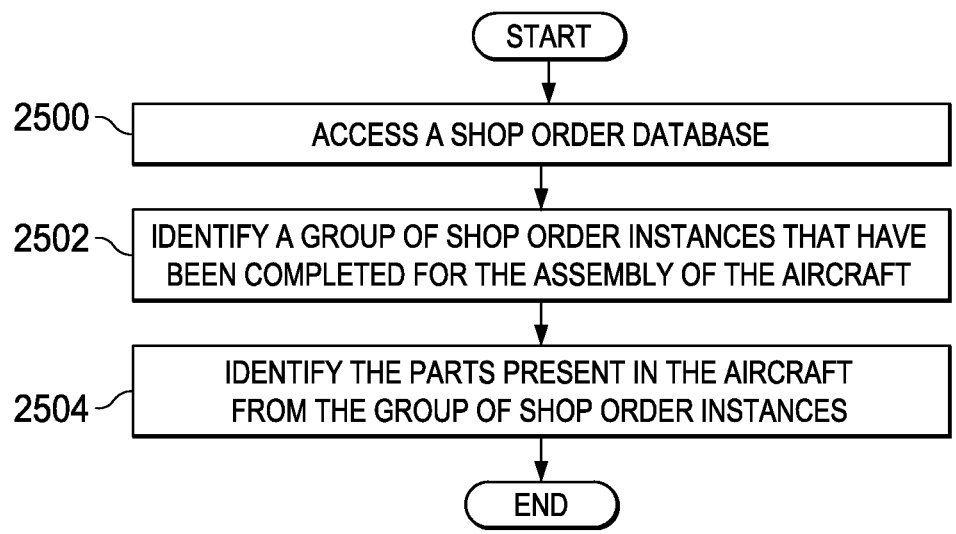
FIG. 25 is an illustration of a flowchart of a process for identifying parts present in aircraft for the current state of assembly of the aircraft in accordance with an illustrative embodiment.

With reference now to FIG. 25, an illustration of a flowchart of a process for identifying parts present in aircraft for the current state of assembly of the aircraft in accordance with an illustrative embodiment. The process illustrated in FIG. 25 is an example of one implementation for operation 2404 in FIG. 24.

The process begins by accessing a shop order database (operation 2500). The shop order database may be, for example, shop order database 212 in FIG. 2. The process then identifies a group of shop order instances that have been completed for the assembly of the aircraft (operation 2502). In operation 2502, this group of shop order instances may be all shop order instances that have been completed since assembly of the aircraft has begun. In other illustrative examples, the group of shop order instances may be only those that are completed for the current position of the aircraft.

The process then identifies the parts present in the aircraft from the group of shop order instances (operation 2504), with the process terminating thereafter. In these illustrative examples, the group of shop order instances may be similar to shop order instance 500 in FIG. 5. An identification of the parts may be made using part identifier 508 in shop order instance 500 in FIG. 5.

Turning now to FIGS. 26A and 26B, an illustration of a more detailed flowchart of a process for identifying differences between parts in multiple aircraft is depicted in accordance with an illustrative embodiment. This process is one illustrative example of identifying states and, in particular, conditions of assembly for an aircraft. The process illustrated in FIGS. 26A and 26B may be implemented in object manager 124 in FIG. 1. In particular, this process may be part of object visualization system 134. One or more operations illustrated may be implemented using object visualizer 204 in FIG. 2.

The process begins by displaying a graphical user interface with a group of buildings in a manufacturing facility (operation 2600). The graphical user interface includes hotspots for the buildings that can be selected. A hotspot is a portion of the graphical user interface that may be selected to cause an action. In these illustrative examples, the buildings are hotspots that may be selected by an operator.

The process then receives user input selecting a building (operation 2602). In the illustrative example, each building may be used to assemble a particular aircraft. The particular aircraft may be a particular type of aircraft. In some cases, more than one building may be used to assemble the same type of aircraft but the particular aircraft may be a specific build for a customer with specific options. In other words, different aircraft of the same type may be assembled in different buildings that have different options although they are of the same type.

Next, a first model of a first aircraft is identified from a selection of the building in the group of buildings in the manufacturing facility (operation 2603). The first aircraft is an aircraft for assembly in the selected building. A second model of a second aircraft is identified (operation 2604). The second model may be selected from other models of the same type of aircraft as the first aircraft in this illustrative example.

Positions in the building are identified (operation 2605). Each building may have different positions for the aircraft that are being assembled. Further, even if a building has the same positions, the status of an aircraft at a particular building at particular positions may be different from other buildings. Further, even with the same positions, different aircraft may be assembled in the positions in different buildings.

The positions are displayed in the graphical user interface (operation 2606). In these illustrative examples, the different positions are hotspots that may be selected through user input entered by an operator. The process then receives user input for selecting a position.

The process then identifies a sectional view for the first aircraft based on a selection of the position (operation 2608). In the illustrative example, each position may have a different sectional view that may be displayed. The sections of the first aircraft in a position are the sections manufactured at the position selected in these illustrative examples. The sectional view includes sections for that particular position.

As depicted, the sectional view may be, for example, sectional view 223 in sectional views 224. Different sectional views are present for different positions in the illustrative example. Sectional view 1005 in FIG. 10 and sectional view 1105 in FIG. 11 are examples of sectional views that may be selected depending on the position selected for the first aircraft in operation 2608.

In these illustrative examples, the sectional views were selected for parts that are present in the aircraft for the position. These are parts that may already be present from assembly of the first aircraft in a prior position or may be parts that are to be assembled in the position selected.

The process then displays sections of the first aircraft (operation 2610). In operation 2610, the sections are displayed in the sectional view of the aircraft. Further, the different sections are displayed in association with hotspots that may be selected by user input entered by an operator. The process then detects a selection of a section from the sections displayed in the graphical user interface (operation 2612). In operation 2612, the section has hotspots associated with the volume identifier. The selection of a section of an aircraft involves selecting the hotspot associated with the aircraft. The hotspot points to a volume identifier, such as volume identifier 222 in FIG. 2. In some cases, the hotspot may be a link pointing to the volume identifier. For example, the hotspot may be an index used to identify a volume identifier.

The process then identifies a first volume in the first model corresponding to the section selected for the first aircraft from the sections displayed in the graphical user interface (operation 2614). The process also identifies a second volume in the second model for the second aircraft in which the second volume corresponds to the first volume (operation 2615).

In these illustrative examples, each section of an aircraft is associated with the first volume for the aircraft. The first volume is identified from volume identifiers associated with sections in the sectional view using the volume identifier pointed to by the hotspot selected for the section. The volume identifier may include information defining the first volume. For example, volume identifier 222 may include volume descriptor 402 as depicted in FIG. 4. In particular, the volume identifier may include a group of coordinates defining the volume in the model.

Next, the process identifies a state from states of assembly for the first aircraft (operation 2616). In these illustrative examples, the state of assembly may be a condition of assembly based on the position of the first aircraft within a manufacturing facility.

The process displays sections of the first aircraft for the state identified for the first aircraft (operation 2617). This display may be, for example, the display of graphical user interface 1000 in FIG. 10 or graphical user interface 1100 and FIG. 11.

The process then identifies first parts that are present for the state in the first volume in the first model corresponding to the section selected (operation 2618). These parts that are present are ones that are present for a particular state for the aircraft.

The process then identifies second parts present in a second volume in the second model for the second aircraft for a corresponding current state of assembly of the second aircraft (operation 2620). In operation 2620, the second aircraft may be one of the same type as the first aircraft being assembled. The corresponding current state of assembly of the second aircraft is the state of assembly for the previously assembled aircraft that corresponds to the current state of assembly that is of interest for the first aircraft. In other words, if the first aircraft is in a particular position on the assembly line, the corresponding state of assembly of the second aircraft is the state of assembly of the aircraft at the same position on the assembly line.

A comparison is made of first parts for the first aircraft in the first model with the second parts for the second aircraft in the second model to form a comparison (operation 2622). This comparison is made to identify a difference between parts in the two aircraft for the selected volume.

The process then displays graphical representations of the first parts and the second parts illustrating a difference between the first parts and the second parts from a comparison of the first parts and the second parts (operation 2624).

Next, a determination is made as to whether a new section of the aircraft has been selected for the position of the aircraft (operation 2625). If any section has been selected, the process then returns to operation 2608 as described above.

If a new section has not been selected, a determination is made as to whether a new position has been selected for the aircraft (operation 2626). If a new position has been selected, the process then returns to operation 2606 as described above. If a new position has not been selected, the process determines whether a new building has been selected (operation 2628). If a new building has been selected, the process returns to operation 2600. Otherwise, the process performs the operation selected by the operator (operation 2630), with the process then returning to operation 2624. In operation 2630, the operator may rotate the parts displayed in the volume, magnify the display, remove parts, annotate parts, or perform other operations with respect to the parts displayed in the volume.

Figure 27:
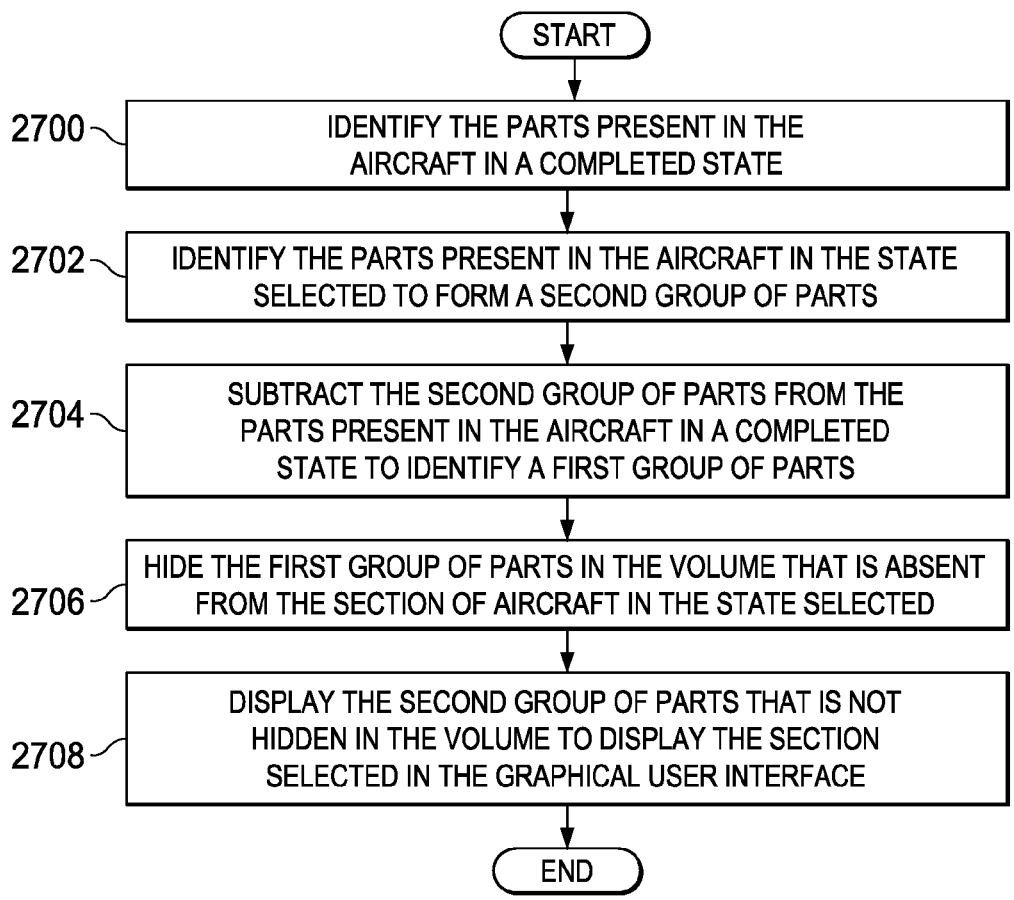
FIG. 27 is an illustration of a flowchart of a process for displaying a section in a graphical user interface in accordance with an illustrative embodiment.

Turning now to FIG. 27, an illustration of a flowchart of a process for displaying a section in a graphical user interface is depicted in accordance with an illustrative embodiment. The different operations illustrated in FIG. 27 are examples of an implementation for operation 2622 in FIG. 26B.

The process identifies the parts present in the aircraft in a completed state (operation 2700). Thereafter, the process identifies the parts present in the aircraft in the state selected to form a second group of parts (operation 2702). The second group of parts is subtracted from the parts present in the aircraft in a completed state to identify a first group of parts (operation 2704).

The process hides the first group of parts in the volume that is absent from the section of aircraft in the state selected (operation 2706). The second group of parts that is not hidden in the volume are displayed to display the section selected in the graphical user interface (operation 2708), with the process terminating thereafter.

Figure 28:
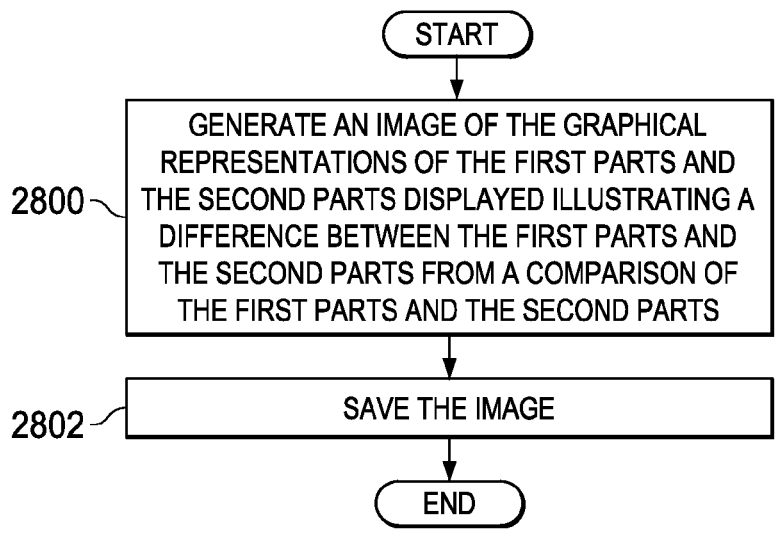
FIG. 28 is an illustration of a flowchart of a process for managing views indicating differences between parts in accordance with an illustrative embodiment.

Turning now to FIG. 28, an illustration of a flowchart of a process for managing views indicating differences between parts is depicted in accordance with an illustrative embodiment. The process illustrated in FIG. 28 is an example of an operation that may be performed for operation 2630 in FIG. 26B.

The process begins by generating an image of the graphical representations of the first parts and the second parts displayed illustrating a difference between the first parts and the second parts from a comparison of the first parts and the second parts (operation 2800). The process then saves the image (operation 2802), with the process terminating thereafter.

In particular, the process illustrated in FIG. 28 may be used by operators at a later time to visualize the difference between different builds of the same type of aircraft. For example, images generated using this process may be included in shop order instances 132 in shop order database 212 in FIG. 2. In particular, these images may be viewed in addition to instructions that may be present in shop order instances 132.

For example, in shop order instance 500 in FIG. 5, instructions 512 may describe assembly of a storage unit in a location for a current build of an aircraft. In the prior build of the same type of aircraft, a different customer option may have called for a lavatory to be assembled in the location.

The image generated using the process in FIG. 28 may be included with instructions 512 in shop order instance 500. The visualization of this difference may aid the operator in becoming familiar with and performing task 505 in shop order instance 500 as described by instructions 512.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

In one illustrative example, sections may not be displayed in an exploded view in operation 2306. Instead, the sections may be displayed as a whole aircraft in which different sections may be selected through hotspots. The different sections may be indicated using lines or other graphical indicators in this type of implementation.

Figure 29:
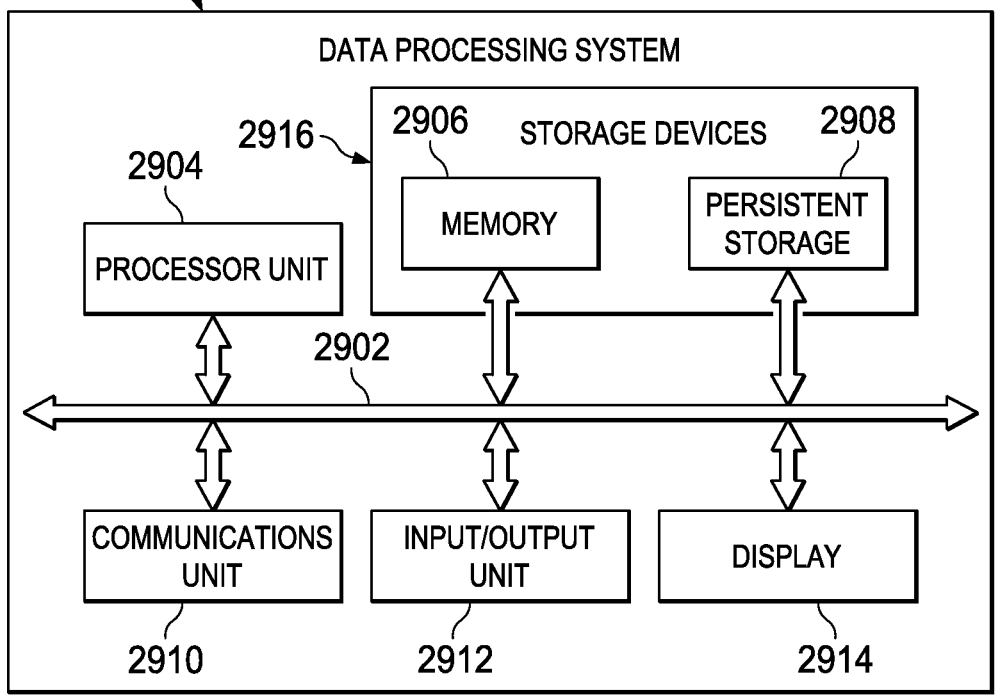
FIG. 29 is an illustration of a block diagram of a data processing system in accordance with an illustrative embodiment.

Turning now to FIG. 29, an illustration of a block diagram of a data processing system is depicted in accordance with an illustrative embodiment. Data processing system 2900 may be used to implement computer system 126 in FIG. 1. In this illustrative example, data processing system 2900 includes communications framework 2902, which provides communications between processor unit 2904, memory 2906, persistent storage 2908, communications unit 2910, input/output unit 2912, and display 2914. In this example, communications framework may take the form of a bus system.

Processor unit 2904 serves to execute instructions for software that may be loaded into memory 2906. Processor unit 2904 may be a number of processors, a multi-processor core, or some other type of processor, depending on the particular implementation.

Memory 2906 and persistent storage 2908 are examples of storage devices 2916. A storage device is any piece of hardware that is capable of storing information, such as, for example, without limitation, data, program code in functional form, and/or other suitable information either on a temporary basis and/or a permanent basis. Storage devices 2916 may also be referred to as computer readable storage devices in these illustrative examples. Memory 2906, in these examples, may be, for example, a random access memory or any other suitable volatile or non-volatile storage device. Persistent storage 2908 may take various forms, depending on the particular implementation.

For example, persistent storage 2908 may contain one or more components or devices. For example, persistent storage 2908 may be a hard drive, a flash memory, a rewritable optical disk, a rewritable magnetic tape, or some combination of the above. The media used by persistent storage 2908 also may be removable. For example, a removable hard drive may be used for persistent storage 2908.

Communications unit 2910, in these illustrative examples, provides for communications with other data processing systems or devices. In these illustrative examples, communications unit 2910 is a network interface card.

Input/output unit 2912 allows for input and output of data with other devices that may be connected to data processing system 2900. For example, input/output unit 2912 may provide a connection for user input through a keyboard, a mouse, and/or some other suitable input device. Further, input/output unit 2912 may send output to a printer. Display 2914 provides a mechanism to display information to a user.

Instructions for the operating system, applications, and/or programs may be located in storage devices 2916, which are in communication with processor unit 2904 through communications framework 2902. The processes of the different embodiments may be performed by processor unit 2904 using computer-implemented instructions, which may be located in a memory, such as memory 2906.

These instructions are referred to as program code, computer usable program code, or computer readable program code that may be read and executed by a processor in processor unit 2904. The program code in the different embodiments may be embodied on different physical or computer readable storage media, such as memory 2906 or persistent storage 2908.

Program code 2918 is located in a functional form on computer readable media 2920 that is selectively removable and may be loaded onto or transferred to data processing system 2900 for execution by processor unit 2904. Program code 2918 and computer readable media 2920 form computer program product 2922 in these illustrative examples.

In one example, computer readable media 2920 may be computer readable storage media 2924 or computer readable signal media 2926. In these illustrative examples, computer readable storage media 2924 is a physical or tangible storage device used to store program code 2918 rather than a medium that propagates or transmits program code 2918.

Alternatively, program code 2918 may be transferred to data processing system 2900 using computer readable signal media 2926. Computer readable signal media 2926 may be, for example, a propagated data signal containing program code 2918. For example, computer readable signal media 2926 may be an electromagnetic signal, an optical signal, and/or any other suitable type of signal. These signals may be transmitted over communications links, such as wireless communications links, optical fiber cable, coaxial cable, a wire, and/or any other suitable type of communications link.

The different components illustrated for data processing system 2900 are not meant to provide architectural limitations to the manner in which different embodiments may be implemented. The different illustrative embodiments may be implemented in a data processing system including components in addition to and/or in place of those illustrated for data processing system 2900. Other components shown in FIG. 29 can be varied from the illustrative examples shown. The different embodiments may be implemented using any hardware device or system capable of running program code 2918.

Figure 30:
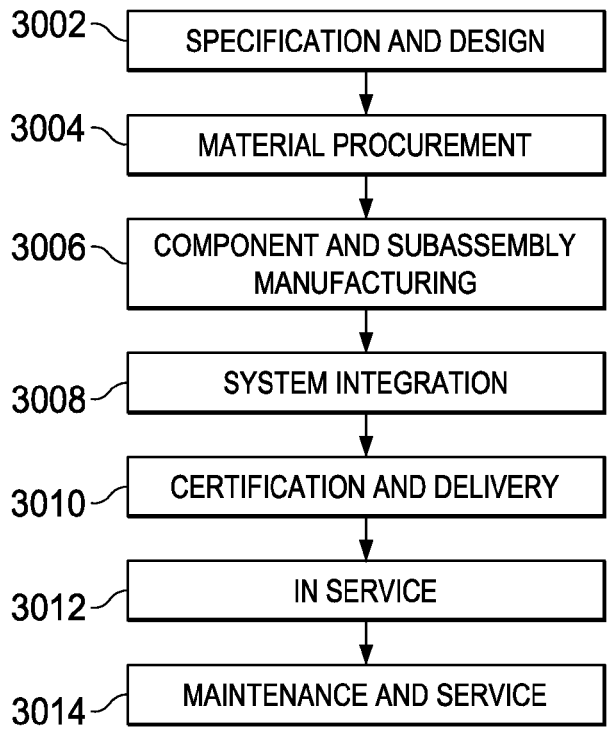
FIG. 30 is an illustration of a block diagram of an aircraft manufacturing and service method in accordance with an illustrative embodiment.
Figure 31:
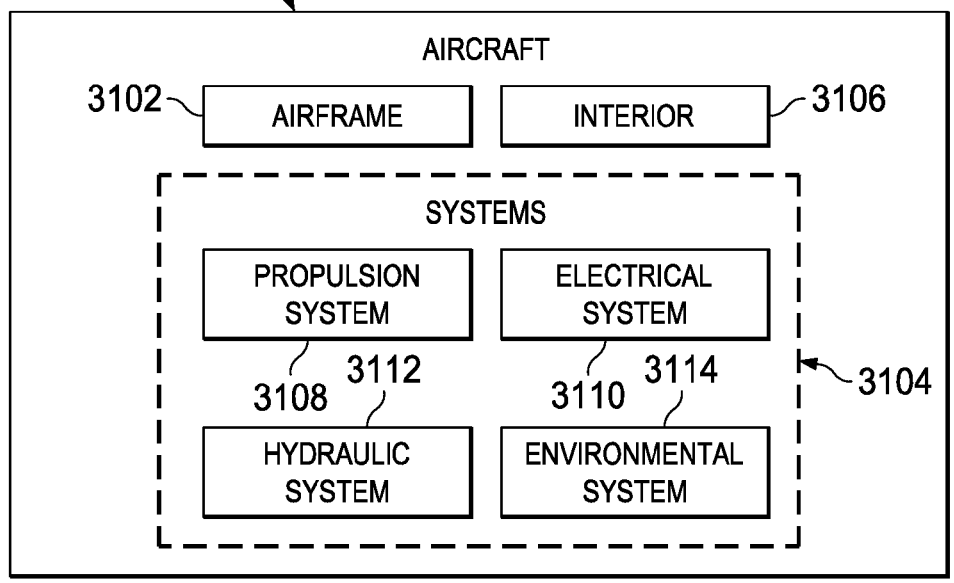
FIG. 31 is an illustration of a block diagram of an aircraft in which an illustrative embodiment may be implemented.

Illustrative embodiments of the disclosure may be described in the context of aircraft manufacturing and service method 3000 as shown in FIG. 30 and aircraft 3100 as shown in FIG. 31. Turning first to FIG. 30, an illustration of a block diagram of an aircraft manufacturing and service method is depicted in accordance with an illustrative embodiment. During pre-production, aircraft manufacturing and service method 3000 may include specification and design 3002 of aircraft 3100 in FIG. 31 and material procurement 3004.

During production, component and subassembly manufacturing 3006 and system integration 3008 of aircraft 3100 in FIG. 31 takes place. Thereafter, aircraft 3100 in FIG. 31 may go through certification and delivery 3010 in order to be placed in service 3012. While in service 3012 by a customer, aircraft 3100 in FIG. 31 is scheduled for routine maintenance and service 3014, which may include modification, reconfiguration, refurbishment, and other maintenance or service.

Each of the processes of aircraft manufacturing and service method 3000 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 31, an illustration of a block diagram of an aircraft is depicted in which an illustrative embodiment may be implemented. In this example, aircraft 3100 is produced by aircraft manufacturing and service method 3000 in FIG. 30 and may include airframe 3102 with systems 3104 and interior 3106. Examples of systems 3104 include one or more of propulsion system 3108, electrical system 3110, hydraulic system 3112, and environmental system 3114. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 3000 in FIG. 30. For example, one or more illustrative embodiments may be implemented during system integration 3008. The different illustrative examples may be implemented to identify information to perform tasks to assemble parts on aircraft 3100.

In particular, the visual query of aircraft may be used to identify locations where tasks for shop order instances are to be performed or where tasks have been performed. Additionally, an illustrative embodiment also may be implemented during maintenance and service 3014. For example, information about the aircraft may be visually queried and viewed by an operator to perform tasks to assemble parts for maintenance, upgrades, refurbishment, and other operations during maintenance and service 3014 may be identified using an illustrative embodiment.

Figure 32:
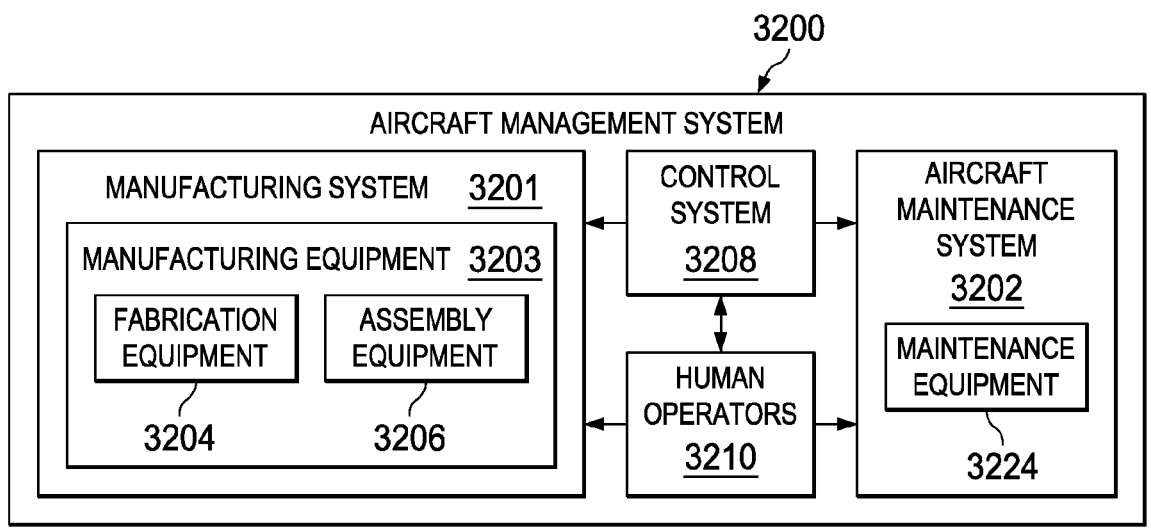
FIG. 32 is an illustration of a block diagram of an aircraft management system in accordance with an illustrative embodiment.

Turning now to FIG. 32, an illustration of a block diagram of an aircraft management system is depicted in accordance with an illustrative embodiment. Aircraft management system 3200 is a physical hardware system. In this illustrative example, aircraft management system 3200 may include at least one of manufacturing system 3201 or aircraft maintenance system 3202.

Manufacturing system 3201 is configured to manufacture products, such as aircraft 3100 in FIG. 31. In this manner, manufacturing system 3201 may take the form of an aircraft manufacturing system in this illustrative example. As depicted, manufacturing system 3201 includes manufacturing equipment 3203. Manufacturing equipment 3203 includes at least one of fabrication equipment 3204 or assembly equipment 3206.

Fabrication equipment 3204 is equipment that may be used to fabricate components for parts used to form aircraft 3100.

For example, fabrication equipment 3204 may include machines and tools. These machines and tools may be at least one of a drill, a hydraulic press, a furnace, a mold, a composite tape laying machine, a vacuum system, a lathe, or other suitable types of equipment. Fabrication equipment 3204 may be used to fabricate at least one of metal parts, composite parts, semiconductors, circuits, fasteners, ribs, skin panels, spars, antennas, or other suitable types of parts.

Assembly equipment 3206 is equipment used to assemble parts to form aircraft 3100. In particular, assembly equipment 3206 may be used to assemble components and parts to form aircraft 3100. Assembly equipment 3206 also may include machines and tools. These machines and tools may be at least one of a robotic arm, a crawler, a faster installation system, a rail-based drilling system, or a robot. Assembly equipment 3206 may be used to assemble parts such as seats, horizontal stabilizers, wings, engines, engine housings, landing gear systems, and other parts for aircraft 3100.

In this illustrative example, aircraft maintenance system 3202 includes maintenance equipment 3224. Maintenance equipment 3224 may include any equipment needed to perform maintenance on aircraft 3100. This maintenance may include tools for performing different operations on parts on aircraft 3100. These operations may include at least one of disassembling parts, refurbishing parts, inspecting parts, reworking parts, manufacturing placement parts, or other operations for performing maintenance on aircraft 3100. These operations may be for routine maintenance, inspections, upgrades, refurbishment, or other types of maintenance operations.

In the illustrative example, maintenance equipment 3224 may include ultrasonic inspection devices, x-ray imaging systems, vision systems, drills, crawlers, and other suitable devices. In some cases, maintenance equipment 3224 may include fabrication equipment 3204, assembly equipment 3206, or both to produce and assemble parts that may be needed for maintenance.

Aircraft management system 3200 also includes control system 3208. Control system 3208 is a hardware system and may also include software or other types of components. Control system 3208 is configured to control the operation of at least one of manufacturing system 3201 or aircraft maintenance system 3202. In particular, control system 3208 may control the operation of at least one of fabrication equipment 3204, assembly equipment 3206, or maintenance equipment 3224.

The hardware in control system 3208 may be using hardware that may include computers, circuits, networks, and other types of equipment. The control may take the form of direct control of manufacturing equipment 3203. For example, robots, computer-controlled machines, and other equipment may be controlled by control system 3208. In other illustrative examples, control system 3208 may manage operations performed by human operators 3210 in manufacturing or performing maintenance on aircraft 3100. In these illustrative examples, object manager 124 in FIG. 1 may be implemented in control system 3208 to manage at least one of the manufacturing or maintenance of aircraft 3100 in FIG. 31.

In the different illustrative examples, human operators 3210 may operate or interact with at least one of manufacturing equipment 3203, maintenance equipment 3224, or control system 3208. This interaction may be performed to manufacture aircraft 3100.

Of course, aircraft management system 3200 may be configured to manage other products other than aircraft 3100. Although aircraft management system 3200 has been described with respect to manufacturing in the aerospace industry, aircraft management system 3200 may be configured to manage products for other industries. For example, aircraft management system 3200 may be configured to manufacture products for the automotive industry as well as any other suitable industries.

In these illustrative examples, object manager 124 in FIG. 1 may be implemented in manufacturing system 3201 to manage the manufacturing of aircraft 3100 in FIG. 31. For example, a comparison of parts in two or more aircraft may be useful in managing the manufacture of aircraft 3100. For example, a configuration of parts in a prior aircraft manufactured before aircraft 3100 compared to plans for manufacturing aircraft 3100 allows for human operators 3210 to become familiar with the new options that may be present. Further, the comparison of parts may be based on a condition of assembly for the aircraft. In particular, comparison may be made from various positions in an assembly line for the aircraft for different human operators in human operators 3210 that may assemble aircraft 3100 at different positions in the assembly line.

In the different illustrative examples, human operators 3210 may operate or interact with at least one of manufacturing equipment 3202 or control system 3208. This interaction may be performed to manufacture aircraft 3100.

Of course, aircraft management system 3200 may be configured to manage other products. Although aircraft management system 3200 has been described with respect to the aerospace industry, aircraft management system 3200 may be configured to manage products for other industries. For example, aircraft management system 3200 may be configured to manufacture products for the automotive industry as well as any other suitable industries.

In this manner, operators may visualize information about an aircraft using a graphical user interface. This visualization may be performed on the shop floor by operators who may not have experience and training with computer-aided design software. This visual query allows an operator to visually look at an aircraft or other object. In particular, comparison may be between an aircraft currently being manufactured and with prior aircraft previously manufactured. Operators may become familiar with changes in options that result in changes in parts when manufacturing the same type of aircraft on the assembly line.

Additionally, the comparison also may be made during maintenance in which upgrades, refurbishment, or other operations may be performed. For example, a refurbishment of aircraft 3100 may include changing seating configurations or other monuments in aircraft 3100. A visualization of the change may be useful in the refurbishment of aircraft 3100.

Further, the visualization may be performed without operators having to know coordinates for locations in the aircraft. In these illustrative examples, the graphical user interface displays graphical representations of the aircraft that allows the operators to view different portions of the aircraft without using coordinates to traverse the views of the aircraft.

Further, with an ability to visualize different conditions of assembly for aircraft 3100, the management of operations performed by manufacturing system 3201 may occur in a manner that reduces the time to manufacture aircraft 3100, increases the efficiency in manufacturing aircraft 3100, increases efficiency in assigning shop order instances for manufacturing aircraft 3100, and other suitable goals.

Further, the visualization of parts may also include an identification of the difference in the assembly of parts for locations between different builds of the same type of aircraft. With the visualizations provided using graphical user interface 208 in FIG. 2, operators that are familiar with the assembly of parts in a particular location in a prior build of an aircraft may more quickly become familiar with the assembly of parts in the same location in a current or upcoming build of the same type of aircraft.

The description of the different illustrative embodiments has been presented for purposes of illustration and description, and is not intended to be exhaustive or limited to the embodiments in the form disclosed. Many modifications and variations will be apparent to those of ordinary skill in the art.

Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for manufacturing an aircraft, the method comprising:
    identifying, using a computer, a first model for a first aircraft for assembly;
    identifying, using the computer, a second model for a second aircraft that has been assembled;
    comparing, using the computer, first parts for the first aircraft in the first model with second parts for the second aircraft in the second model;
    displaying, on a tangible display in communication with the computer, graphical representations of the first parts and the second parts illustrating a difference between the first parts and the second parts from a comparison of the first parts and the second parts, wherein only third parts from the first parts and the second parts that include the difference are displayed; and
    manufacturing the first aircraft based on the difference.

2. The method of claim 1 further comprising:
    identifying the first parts and the second parts for comparison.

3. The method of claim 2, wherein identifying the first parts and the second parts for comparison comprises:
    identifying a first volume in the first model for the first aircraft;
    identifying a second volume in the second model for the second aircraft, wherein the second volume corresponds to the first volume;
    identifying the first parts in the first volume; and
    identifying the second parts in the second volume.

4. The method of claim 1, wherein identifying a first volume in the first model for the first aircraft comprises:
    displaying sections of an aircraft in a graphical user interface on a display device, wherein the sections correspond to sections as manufactured for assembly of the aircraft and wherein the sections are selectable;
    detecting a selection of a section from the sections displayed in the graphical user interface;
    identifying the first volume in the first model corresponding to the section selected from the sections displayed in the graphical user interface; and
    wherein identifying a second volume in the second model for the second aircraft, wherein the second volume corresponds to the first volume comprises:
    identifying the second volume in the second model corresponding to the section selected from the sections displayed in the graphical user interface.

5. The method of claim 2, wherein identifying the first parts and the second parts for comparison comprises:
    identifying the first parts from a user input selecting the first parts from a list of parts.

6. The method of claim 3, wherein identifying the first parts in the first volume comprises:
    identifying a current state of assembly of an aircraft;
    identifying the first parts present in the first volume in the first model for the first aircraft for the current state of assembly of the first aircraft; and
    wherein identifying the second parts in the second volume comprises:
    identifying the second parts present in the second volume in the second model for the second aircraft for a corresponding current state of assembly of the second aircraft.

7. The method of claim 1 further comprising:
    displaying a group of graphical indicators on a group of parts in a location.

8. The method of claim 1 further comprising:
    managing assembly of the first parts based on a display of the graphical representations of the first parts and the second parts illustrating the difference between the first parts and the second parts from the comparison of the first parts and the second parts.

9. The method of claim 1, wherein the difference is a difference in customer options between the first aircraft and the second aircraft.

10. An apparatus comprising:
    an object manager, implemented as software stored and executable by a computer, configured to identify a first model for a first aircraft for assembly; identify a second model for a second aircraft that has been assembled; compare first parts for the first aircraft in the first model with second parts for the second aircraft in the second model; and display graphical representations of the first parts and the second parts illustrating a difference between the first parts and the second parts from a comparison of the first parts and the second parts, wherein the object manager is configured to display only third parts from the first parts and the second parts that include the difference;
    a tangible display in communication with the computer and configured to display the difference; and
    assembly equipment including at least one of a robotic arm, a crawler, a fastener installation system, a rail-based drilling system, or a robot, the assembly equipment configured to manufacture the first aircraft using the assembly equipment based on the difference.

11. The apparatus of claim 10, wherein the object manager is further configured to identify the first parts and the second parts for comparison.

12. The apparatus of claim 11, wherein in being configured to identify the first parts and the second parts for comparison, the object manager is configured to identify a first volume in the first model for the first aircraft; identify a second volume in the second model for the second aircraft, wherein the second volume corresponds to the first volume; identify the first parts in the first volume; and identify the second parts in the second volume.

13. The apparatus of claim 10, wherein in being configured to identify a first volume in the first model for the first aircraft, the object manager is configured to display sections of an aircraft in a graphical user interface on a display device, wherein the sections correspond to sections as manufactured for assembly of the aircraft and wherein the sections are selectable; detect a selection of a section from the sections displayed in the graphical user interface; and identify the first volume in the first model corresponding to the section selected from the sections displayed in the graphical user interface; and wherein in being configured to identify a second volume in the second model for the second aircraft, wherein the second volume corresponds to the first volume, the object manager is configured to identify the second volume in the second model corresponding to the section selected from the sections displayed in the graphical user interface.

14. The apparatus of claim 11, wherein in being configured to identify the first parts and the second parts for comparison, the object manager is configured to identify the first parts from a user input selecting the first parts from a list of parts.

15. The apparatus of claim 12, wherein in being configured to identify the first parts in the first volume, the object manager is configured to identify a current state of assembly of an aircraft; and identify the first parts present in the first volume in the first model for the first aircraft for the current state of assembly of the first aircraft; and wherein in being configured to identify the second parts in the second volume, the object manager is configured to identify the second parts present in the second volume in the second model for the second aircraft for a corresponding current state of assembly of the second aircraft.

16. The apparatus of claim 10, wherein the difference is a difference in customer options between the first aircraft and the second aircraft.

17. An aircraft manufacturing system comprising:

an object manager, implemented as software stored and executable by a computer, wherein the object manager is configured to identify a first model for a first aircraft for assembly; identify a second model for a second aircraft that has been assembled;

compare first parts for the first aircraft in the first model with second parts for the second aircraft in the second model; and display graphical representations of the first parts and the second parts illustrating a difference between the first parts and the second parts from a comparison of the first parts and the second parts, wherein the object manager is configured to display only third parts from the first parts and the second parts that include the difference;

manufacturing equipment including at least one of a robotic arm, a crawler, a fastener installation system, a rail-based drilling system, or a robot, the manufacturing equipment configured to manufacture the first aircraft using the assembly equipment based on the difference; and a control system configured to control operation of the manufacturing equipment to manufacture the first aircraft, the control system including the computer.

18. The aircraft manufacturing system of claim 17, wherein the object manager is further configured to identify the first parts and the second parts for comparison.

19. The aircraft manufacturing system of claim 17, wherein the difference is a difference in customer options between the first aircraft and the second aircraft.

20. The aircraft manufacturing system of claim 17, wherein the manufacturing equipment comprises at least one of fabrication equipment and assembly equipment.

\* \* \* \* \*